(12) United States Patent
Deichmann et al.

(10) Patent No.: US 10,690,494 B2
(45) Date of Patent: *Jun. 23, 2020

(54) DUAL-RESOLUTION 3D SCANNER AND METHOD OF USING

(71) Applicant: 3SHAPE A/S, Copenhagen K (DK)

(72) Inventors: Nikolaj Deichmann, Copenhagen (DK); Mike Van der Poel, Rødovre (DK); Karl-Josef Hollenbeck, København Ø (DK); Rune Fisker, Virum (DK)

(73) Assignee: 3SHAPE A/S, Copenhagen K (DK)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,488

(22) Filed: Mar. 5, 2019

(65) Prior Publication Data

US 2019/0195627 A1 Jun. 27, 2019

Related U.S. Application Data

(63) Continuation of application No. 15/452,139, filed on Mar. 7, 2017, which is a continuation of application
(Continued)

(30) Foreign Application Priority Data

Jun. 6, 2011 (DK) .................................. 2011 00426

(51) Int. Cl.
*G06K 9/00* (2006.01)
*G06K 9/36* (2006.01)
(Continued)

(52) U.S. Cl.
CPC .............. *G01B 21/18* (2013.01); *G01B 11/24* (2013.01); *G01B 11/245* (2013.01); *G01B 11/25* (2013.01);
(Continued)

(58) Field of Classification Search
USPC .......................... 382/154, 128, 284; 600/443
See application file for complete search history.

(56) References Cited

U.S. PATENT DOCUMENTS

| | | | |
|---|---|---|---|
| 4,288,821 A | 9/1981 | Lavallee et al. | |
| 4,907,282 A * | 3/1990 | Daly ....................... | G09G 5/24 |
| | | | 345/471 |

(Continued)

FOREIGN PATENT DOCUMENTS

| | | |
|---|---|---|
| WO | 2007030026 | 3/2007 |
| WO | 2009089126 | 7/2009 |
| WO | 2010145669 | 12/2010 |

OTHER PUBLICATIONS

International Search Report (PCT/ISA/210) dated Jan. 25, 2013, by the European Patent Office as the International Search Authority for Internationai Application No. PCT/EP2012/060741.

*Primary Examiner* — Kathleen Y Dulaney

(74) *Attorney, Agent, or Firm* — Buchanan Ingersoll & Rooney PC

(57) ABSTRACT

A 3D scanner system includes a scanning device capable of recording first and second data sets of a surface of an object when operating in a first configuration and a second configuration, respectively. A measurement unit is configured for measuring a distance from the scanning device to the surface. A control controls an operation of the scanning device based on the distance measured by the measurement unit, where the scanning device operates in the first configuration when the measured distance is within a first range of distances from the surface and the scanning device operates in the second configuration when the measured distance is within a second range of distances; and a data processor is configured to combine one or more first data sets and one or more second data sets to create a combined virtual 3D model of the object surface.

24 Claims, 10 Drawing Sheets

Related U.S. Application Data

No. 14/124,175, filed as application No. PCT/EP2012/060741 on Jun. 6, 2012, now Pat. No. 9,625,258.

(60) Provisional application No. 61/494,291, filed on Jun. 7, 2011.

(51) Int. Cl.

| | | |
|---|---|---|
| *G01B 21/18* | (2006.01) | |
| *H04N 13/25* | (2018.01) | |
| *G06T 17/00* | (2006.01) | |
| *G01B 11/25* | (2006.01) | |
| *G01B 11/24* | (2006.01) | |
| *G01B 11/245* | (2006.01) | |
| *H04N 1/00* | (2006.01) | |

(52) U.S. Cl.
CPC ...... *G01B 11/2513* (2013.01); *G01B 11/2518* (2013.01); *G06T 17/00* (2013.01); *H04N 1/00827* (2013.01); *H04N 13/25* (2018.05)

(56) References Cited

U.S. PATENT DOCUMENTS

| | | | |
|---|---|---|---|
| 5,504,319 A | | 4/1996 | Li et al. |
| 6,061,086 A | | 5/2000 | Reimer et al. |
| 6,172,755 B1 | | 1/2001 | Norita et al. |
| 6,249,600 B1 | * | 6/2001 | Reed ............... G06T 17/00 345/420 |
| 6,519,359 B1 | | 2/2003 | Nafis et al. |
| 6,781,618 B2 | | 8/2004 | Beardsley |
| 6,876,762 B1 | | 4/2005 | Ono |
| 6,920,236 B2 | * | 7/2005 | Prokoski ............ G06K 9/00221 356/71 |
| 6,970,608 B1 | | 11/2005 | Michael |
| 7,340,099 B2 | * | 3/2008 | Zhang ............... G06T 5/50 348/33 |
| 7,394,977 B2 | * | 7/2008 | Park ............... G06T 1/0007 345/419 |
| 7,372,985 B2 | | 8/2008 | So |
| 7,583,275 B2 | | 9/2009 | Neumann et al. |
| 7,756,327 B2 | * | 7/2010 | Komiya ............. A61B 5/0088 382/162 |
| 7,756,357 B2 | | 7/2010 | Yoneyama |
| 7,809,171 B2 | * | 10/2010 | Solinsky ............ G06K 9/00248 382/115 |
| 7,822,263 B1 | * | 10/2010 | Prokoski ............ F42B 35/00 382/152 |
| 8,019,114 B2 | * | 9/2011 | Endo ............... G01B 11/2504 382/100 |
| 8,064,068 B2 | | 11/2011 | Fisher |
| 8,082,120 B2 | | 12/2011 | St-Pierre et al. |
| 8,115,814 B2 | | 2/2012 | Iwase et al. |
| 8,130,225 B2 | * | 3/2012 | Sullivan ............ G06T 17/20 345/156 |
| 8,150,105 B2 | * | 4/2012 | Mian ............... G06K 9/00214 382/104 |
| 8,284,240 B2 | | 10/2012 | Saint-Pierre et al. |
| 8,340,402 B2 | | 12/2012 | Schmitt |
| 8,427,472 B2 | | 4/2013 | Moravec |
| 8,427,505 B2 | * | 4/2013 | Karp ............... G01C 11/06 345/630 |
| 8,446,410 B2 | * | 5/2013 | Choi ............... G06T 17/00 345/424 |
| 8,447,474 B2 | | 5/2013 | Breed |
| 8,542,872 B2 | * | 9/2013 | Gornick ............ G06K 9/00771 382/103 |
| 8,556,625 B2 | | 10/2013 | Lovely |
| 8,630,465 B2 | * | 1/2014 | Wieringa ............ A61B 5/0059 382/128 |
| 8,659,668 B2 | | 2/2014 | Cotter |
| 8,768,010 B2 | | 7/2014 | Korekado |
| 8,830,309 B2 | | 9/2014 | Rohaly |
| 8,885,025 B2 | | 11/2014 | Iwabuchi et al. |
| 8,948,501 B1 | * | 2/2015 | Kim ............... G01S 7/4808 345/419 |
| 9,303,989 B2 | * | 4/2016 | Nehmadi ............ G01C 11/06 |
| 2001/0036307 A1 | | 11/2001 | Hanna |
| 2001/0046316 A1 | * | 11/2001 | Miyano ............. A61B 5/0064 382/154 |
| 2001/0050999 A1 | | 12/2001 | Bacus et al. |
| 2002/0031252 A1 | | 3/2002 | Rozin |
| 2002/0057471 A1 | | 5/2002 | Tang et al. |
| 2002/0080135 A1 | * | 6/2002 | Sakakibara ............ G06T 7/593 345/419 |
| 2002/0181762 A1 | | 12/2002 | Silber |
| 2003/0012425 A1 | * | 1/2003 | Suzuki ............... G02B 30/27 382/154 |
| 2003/0081821 A1 | | 5/2003 | Mertelmeier |
| 2003/0202089 A1 | | 10/2003 | Alhadef et al. |
| 2004/0184648 A1 | | 9/2004 | Zhang |
| 2005/0033142 A1 | | 2/2005 | Madden et al. |
| 2005/0069195 A1 | | 3/2005 | Uezono |
| 2005/0090749 A1 | | 4/2005 | Rubbert |
| 2005/0254726 A1 | * | 11/2005 | Fuchs ............... H04N 5/74 382/285 |
| 2005/0271264 A1 | | 12/2005 | Ito et al. |
| 2006/0115144 A1 | * | 6/2006 | Kanai ............... G06K 9/00362 382/154 |
| 2006/0210146 A1 | * | 9/2006 | Gu ............... G01B 11/25 382/154 |
| 2007/0065002 A1 | * | 3/2007 | Marzell ............ G06T 17/00 382/154 |
| 2007/0110293 A1 | * | 5/2007 | Arnon ............ G06K 9/00362 382/128 |
| 2007/0116345 A1 | | 5/2007 | Peterson et al. |
| 2007/0127756 A1 | * | 6/2007 | Slabaugh ............ A61B 5/1076 381/328 |
| 2008/0056568 A1 | * | 3/2008 | Porikli ............ G06K 9/00624 382/173 |
| 2008/0247635 A1 | | 10/2008 | Davis et al. |
| 2008/0247636 A1 | | 10/2008 | Davis et al. |
| 2009/0073419 A1 | * | 3/2009 | Gesner ............ G01B 11/026 356/73 |
| 2009/0161989 A1 | | 6/2009 | Sim |
| 2009/0167909 A1 | | 7/2009 | Imagawa et al. |
| 2009/0245591 A1 | | 10/2009 | Rowe et al. |
| 2009/0316966 A1 | | 12/2009 | Marshall et al. |
| 2009/0323121 A1 | | 12/2009 | Valkenburg et al. |
| 2010/0023015 A1 | | 1/2010 | Park |
| 2010/0036233 A1 | | 2/2010 | Zhu et al. |
| 2010/0045448 A1 | | 2/2010 | Kakinami |
| 2010/0172567 A1 | * | 7/2010 | Prokoski ............ A61B 5/0064 382/132 |
| 2010/0208104 A1 | * | 8/2010 | Imagawa ............ H04N 5/2176 348/234 |
| 2010/0283781 A1 | * | 11/2010 | Kriveshko ............ H04N 13/221 345/419 |
| 2011/0007951 A1 | * | 1/2011 | Mil'shtein ......... G06K 9/00033 382/124 |
| 2011/0075916 A1 | | 3/2011 | Knothe |
| 2011/0090457 A1 | * | 4/2011 | Shikaumi ............ A61B 3/14 351/206 |
| 2011/0123097 A1 | | 5/2011 | Van Copponelle |
| 2011/0135190 A1 | * | 6/2011 | Maad ............. A61B 6/0407 382/154 |
| 2011/0175625 A1 | | 7/2011 | Huizing |
| 2011/0176715 A1 | * | 7/2011 | Foos ............... G06T 11/006 382/131 |
| 2011/0249095 A1 | | 10/2011 | Kim |
| 2011/0255746 A1 | * | 10/2011 | Berkovich ......... G06K 9/00214 382/103 |
| 2011/0298907 A1 | | 12/2011 | Lee |
| 2012/0035887 A1 | | 2/2012 | Augenbraun et al. |
| 2012/0039525 A1 | * | 2/2012 | Tian ............... G06T 5/005 382/154 |
| 2012/0050525 A1 | * | 3/2012 | Rinner ............ G06T 7/33 348/117 |

(56) References Cited

U.S. PATENT DOCUMENTS

| | | | |
|---|---|---|---|
| 2012/0092461 A1* | 4/2012 | Fisker | A61B 5/0068 |
| | | | 348/46 |
| 2012/0201477 A1 | 8/2012 | Jesneck | |
| 2012/0263371 A1* | 10/2012 | Buscema | G06T 5/50 |
| | | | 382/154 |
| 2013/0249907 A1 | 9/2013 | Humphries et al. | |
| 2013/0307936 A1* | 11/2013 | Kim | G06K 9/6201 |
| | | | 348/47 |
| 2014/0276059 A1 | 9/2014 | Sheehan | |
| 2014/0294250 A1 | 10/2014 | Aoki | |
| 2014/0368504 A1* | 12/2014 | Chen | G06T 17/005 |
| | | | 345/424 |
| 2015/0193559 A1 | 7/2015 | Musuvathy | |
| 2016/0314592 A1 | 10/2016 | Chen et al. | |
| 2016/0324580 A1 | 11/2016 | Esterberg | |
| 2017/0061036 A1 | 3/2017 | Schmidt et al. | |
| 2018/0028063 A1 | 2/2018 | Elbaz et al. | |

\* cited by examiner

DUAL-RESOLUTION 3D SCANNER AND METHOD OF USING

CROSS-REFERENCE TO RELATED APPLICATIONS

This application is a continuation of U.S. Ser. No. 15/452,139, filed on Mar. 7, 2017, which application is a continuation of U.S. Ser. No. 14/124,175, filed on Mar. 5, 2014, and which is a national stage application of PCT/EP2012/060741, filed on Jun. 6, 2012, and which claims the benefit of U.S. 61/494,291, filed on Jun. 7, 2011, and claims the priority of Danish Patent Application PA 2011 00426, filed on Jun. 6, 2011. The contents of U.S. Ser. No. 15/452,139; U.S. Ser. No. 14/124,175; PCT/EP2012/060741; U.S. 61/494,291; and Danish Patent Application PA 2011 00426 are incorporated herein by reference.

FIELD OF THE INVENTION

This disclosure generally relates to an integrated 3D scanner which is capable of operating in two configurations, where each configuration is capable of providing a data set relating to the surface of an object. The spatial resolution of the data set provided by a second configuration is higher than that provided by a first configuration.

The integrated 3D scanner is hence a dual-resolution 3D scanner capable of acquiring data relating to the surface of an object at two spatial resolutions and the integrated 3D scanner may also be referred to as a dual-resolution 3D scanner.

BACKGROUND

Many high-resolution scanning device configurations which are capable of providing high spatial resolution data relating to e.g. the surface of an object are only capable of viewing a limited region of the surface.

When scanning an object where a first structure and a second structure on the surface are separated by a distance which is larger than the area viewed by such a high-resolution scanning device configuration, there may occur errors in the relative position of individual data sets and offset errors may occur e.g. when combining the data sets. This is especially true when the surface does not provide any structure between the first and second structures which otherwise could be used as landmarks.

For such applications, the integrated 3D scanner of the present disclosure has an advantage over prior art 3D scanners.

SUMMARY

Disclosed is an integrated 3D scanner for scanning a surface of an object, said integrated 3D scanner comprising:
- a scanning device capable of operating in a first configuration and in a second configuration, where
  - in said first configuration the scanning device is capable of acquiring a first data set relating to the surface of the object; and
  - in said second configuration the scanning device is capable of acquiring a second data set relating to the surface of the object; and
- a data processing unit configured for combining one or more first data sets and one or more second data sets to provide a combined data set;

where the first and second configurations of the scanning device are such that the second data set represents data with a higher spatial resolution than the first data set.

One advantage of the dual-resolution scheme provided by the two configurations of the scanning device may be that when scanning e.g. a surface wherein the interesting structures of the surface are separated by significant distances, the integrated 3D scanner may allow a user to obtain high-resolution data relating to these structures using the scanning device in the second configuration, while the first configuration may provide low-resolution data relating to the surface between the structures. A combined data set with such low-resolution data and such high-resolution data may then provide high-resolution data at the structures where this is advantageous while between these structures, the object is represented by low-resolution data. Thereby the requirements to the integrated 3D scanner and/or the scanner system comprising the integrated 3D scanner with respect to calculation power and memory size may be reduced.

The dual-resolution scheme provided by the two configurations of the scanning device may also be advantageous in relative to the accuracy of the data acquired from the surface of an object. In some scanning techniques a combination of small-area data sets each relating to a relatively smaller area provides one large-area data set relating to relative a larger area of the surface. In such scanning techniques, the accumulation of errors in the relative positions of the small-area data sets in the "large area" data set may become significant. Structures in the surface of the object is often used for ensuring that the relative positions of the small-area data sets is correct, but in cases where the surface lacks such structures in some regions, a significant uncertainty in the positions of the individual small-area data sets occur and when scanning across such a surface, the accumulated inaccuracy may become significant. One advantage of the two configurations provided by the integrated 3D scanner is that the first configuration may be adapted to acquire data relating to a large area of the surface thus potentially covering at least two neighboring structures at all times during the scanning. The spatial resolution provided of the first configuration of the scanning device is not as high as the spatial resolution provided by the second configuration, but when the acquired first data sets can be combined without any stitching errors, the overall result obtained by the combined data set may still provide a more precise information of the relative positions of different structures on the surface of an object. The integrated 3D scanner according to the present disclosure may thus provide high-resolution data relating to different structures on a surface while still have a relatively precise locating of the structures relative to each other.

In the context of the present disclosure, the phrase "the first and second configurations of the scanning device are such that the second data set represents data with a higher spatial resolution than the first data set" may refer to the case where the second configuration is capable of providing a virtual 3D representation of the surface of an object with a higher spatial resolution than what can be obtained using the first configuration of the scanning device.

For an integrated 3D scanner where the scanning device in the first configuration is capable of receiving and detecting a first spatial distribution of electromagnetic signals from a first focal plane, and in the second configuration is capable of receiving and detecting a second spatial distribution of electromagnetic signals from a second focal plane, the second data set represents data with a higher spatial resolution than the first data set when the spatial resolution of the second spatial distribution is higher than the spatial resolution of the first spatial distribution.

In some embodiments, the higher spatial resolution relates at least to a higher lateral spatial resolution, i.e. the spatial resolution provided by the scanning device in a plane substantially perpendicular to an optical axis of the scanning device. The optical axis may be substantially identical to the line of sight from a volume from which the integrated 3D scanner can acquire data sets to the integrated 3D scanner. I.e. in some embodiments, the first and second configurations of the scanning device are such that second data set represents data with a higher transverse spatial resolution than the first data set.

In some embodiments, the higher spatial resolution relates to said higher lateral spatial resolution and to a higher resolution along the optical axis of the scanner device.

According to one object of the disclosure is disclosed is an integrated 3D scanner for scanning a surface of an object, said integrated 3D scanner comprising:
  a scanning device capable of operating in a first configuration and in a second configuration, where
    in said first configuration the scanning device is capable of acquiring a first data set relating to the surface of the object; and
    in said second configuration the scanning device is capable of acquiring a second data set relating to the surface of the object; and
  a data processing unit configured for combining one or more first data sets and one or more second data sets to provide a combined data set;
where the first and second configurations of the scanning device are such that the second data set represents data with a higher spatial resolution than the first data set.

Disclosed is an integrated 3D scanner for scanning a surface of an object, said integrated 3D scanner comprising:
  a scanning device capable of operating in a first configuration and in a second configuration, where
    in said first configuration the scanning device is capable of acquiring a first data set relating to the surface of the object; and
    in said second configuration the scanning device is capable of acquiring a second data set relating to the surface of the object; and
  a data processing unit configured for combining one or more first data sets and one or more second data sets to provide a combined data set;
where the first configuration has a larger field of view than the second configuration.

Disclosed is an integrated 3D scanner for scanning a surface of an object, said integrated 3D scanner comprising:
  a scanning device capable of operating in a first configuration and in a second configuration, where
    in said first configuration the scanning device is capable of receiving and detecting a first spatial distribution of electromagnetic signals from a first focal plane with a first spatial resolution, and translating the first focal plane relative to the integrated 3D scanner such that a number of first spatial distributions can be received, and forming a first data set from the number of received first spatial distributions of electromagnetic signals; and
    in said second configuration the scanning device is capable of receiving and detecting a second spatial distribution of electromagnetic signals from a second focal plane with a second spatial resolution, and translating the second focal plane relative to the integrated 3D scanner such that a number of second spatial distributions can be received, and forming a second data set from the number of received second spatial distributions of electromagnetic signals;
  a data processing unit configured for combining one or more first data sets and one or more second data sets to provide a combined data set;
where the second spatial resolution is higher than the first spatial resolution.

The first and second spatial distributions may relate to partially identical portions of the surface for a certain distance between the scanning device and the surface of the object.

Disclosed is a scanner system for scanning a surface of an object, where the system comprises the integrated 3D scanner according to the present disclosure.

Disclosed is a method for scanning a surface of an object, wherein said method comprises:
  obtaining an integrated 3D scanner according to the present disclosure;
  arranging the integrated 3D scanner in relation to the object, such that electromagnetic signals from the object surface can be received by the scanning device of the integrated 3D scanner;
  acquiring at least one first data set and at least one second data set relating to the object surface with the scanning device operating in the first and second configuration, respectively; and
  combining the at least one first data set and the at least one second data set to provide a combined data set.

In some embodiments, the scanning device is capable of acquiring a number of first data sets when operated in the first configuration.

In some embodiments, the scanning device is capable of acquiring a number of second data sets when operated in the second configuration. This may be advantageous when several second data sets must be acquired for a structure on the surface and when a large surface is to be scanned where a number of structures are distributed over the surface with some distance between the structures. The number of second data sets can then be acquired and combined with the first data set to provide a combined data set in which the structures are imaged at high spatial resolution.

There may be distances from the object surface at which the configurations of the scanner device are not capable of acquiring data sets of the surface, i.e. where the scanner device cannot acquire data sets from which geometrical information relating to the surface can be derived.

In some embodiments, the configurations of the scanning device are capable of acquiring data sets when arranged in a range of positions relative to the surface, i.e. where the scanner device can acquire data sets from which geometrical information relating to the surface can be derived.

In some embodiments, the first configuration of the scanning device is capable of acquiring first data sets from surfaces which are arranged in a first range of distances from the integrated 3D scanner. I.e. the scanning device is capable of acquiring first data sets when the integrated 3D scanner is arranged at a distance within the first range of distances from the surface of an object.

In some embodiments, the second configuration of the scanning device is capable of acquiring second data sets from surfaces which are arranged in a second range of distances from the integrated 3D scanner. I.e. the scanning device is capable of acquiring second data sets when the integrated 3D scanner is arranged at a distance within the second range of distances from the surface of an object.

In some embodiments, the first configuration of the scanning device is such that the scanning device is capable of acquiring one or more first data sets of the object surface when the integrated 3D scanner is arranged at a first distance from the object, where said first distance may be within first range of distances.

In some embodiments, the second configuration of the scanning device is such that the scanning device is capable of acquiring one or more second data sets of the object surface when the integrated 3D scanner is arranged at a second distance from the object, where said second distance may be within second range of distances.

In the context of the present disclosure, the distance may be defined as the distance from the integrated 3D scanner to a point on the surface which is at or near the center of the area of the surface from which the scanning device receives electromagnetic signals.

The first range of distances range may correspond to positions of the integrated 3D scanner relative to the surface where the surface is within the depth-of-field for the scanning device in the first configuration.

The second range of distances range may correspond to positions of the integrated 3D scanner relative to the surface where the surface is within the depth-of-field for the scanning device in the second configuration.

The first and/or the second range of distances may be such that the scanner device in the first and/or second configuration is capable of acquiring data sets from the surface also when the integrated 3D scanner is substantially at the surface of the object.

The scanning device may be such that a gap must be present between the surface of the object and the integrated 3D scanner in order for the scanning device to be able to acquire data sets relating to the surface.

In the context of the present disclosure, the phrase "the scanning device is capable of acquiring a data set" may refer to the situation where the electromagnetic signals captured by the scanning device can be used for generating a 2D or 3D image in which structures of a surface of an object can be distinguished. This is e.g. the case when distance between the integrated 3D scanner and an object surface is such that the object surface is arranged at the focal plane of the scanner device in the given configuration. When this is the case, the first or second data set can be used for providing a 2D image or a virtual 3D representation of the object surface in which individual structures of the surface can be recognized.

The phrase "capable of acquiring a data set" may be used when at least one requirement to how an acquired data set presents the surface of an object is fulfilled. The requirement may relate to how clearly different structures of the surface can be identified in the data set. For example, when the data set relates to an image of the surface, the requirement may relate to the sharpness of the image, such that e.g. a maximum blurring of the structures are allowed. In other cases, knowledge of the fine structure of the surface is not important and the requirement may relate to other parameters.

In the context of the present disclosure, a configuration of the scanner device may be said to be capable of acquiring a data set when it is capable of capturing a data set from which geometrical information about the object surface can be derived.

In some embodiments, the first configuration of the scanning device is such that when an object surface is arranged outside a first range of distances, the first configuration of the scanning device is not capable of acquiring a first data set which provides valuable information relating to the surface when arranged outside this first range of distances.

In some embodiments, the second configuration of the scanning device is such that when an object surface is arranged outside a second range of distances, the second configuration of the scanning device is not capable of acquiring a second data set which provides valuable information relating to the surface when arranged outside this second range of distances.

In the context of the present disclosure, the phrase "the scanning device is not capable of acquiring" may refer to the situation where electromagnetic signals received and detected by the scanning device cannot be used to provide a useful representation of the surface of an object, such as when the first or second data set cannot provide an image in which individual structures of the surface can be recognized and the scanner device cannot acquire data sets which provide valuable information relating to the surface.

In some embodiments, the first configuration of the scanning device comprises a first sensor element for capturing electromagnetic radiation from the object surface and a data processor unit comprising computer code for generating said first data set from said captured electromagnetic radiation such that said first data set can be acquired by the scanning device in the first configuration.

In some embodiments, the second configuration of the scanning device comprises a second sensor element capturing electromagnetic radiation from the object surface and a data processor unit comprising computer code for generating said second data set from said captured electromagnetic radiation such that said second data set can be acquired by the scanning device in the second configuration.

The data processor unit comprising computer code for generating the first and second data sets may be the same data processor unit which combines the acquired first and second data sets.

In some embodiments, the integrated 3D scanner comprises a control unit configured for controlling the operation of the scanning device, such as for automatically controlling the operation.

In some embodiments, the control device is adapted to allow a user to manually provide information to the scanning device relating to which configuration the scanning device shall operate in. This information may be provided e.g. by pressing a button.

The control unit may be part of the scanning device, such that in some embodiments, the scanning device comprises a control unit configured for controlling the operation of the scanning device, such as for automatically controlling the operation.

The control unit may be configured for automatically controlling the acquiring of one or more data sets in at least one of the configurations of the scanning device.

In some embodiments, the control unit is capable of automatically changing the operation of the scanning device between the first configuration and the second configuration.

In some embodiments, the scanning device is capable of operating simultaneously in the first and second configurations. In such an embodiment, the control unit may be configured for automatically changing between operating the scanning device in the first and second configurations simultaneously and operating the scanning device in only one of the first or second configurations. When operating the scanning device in the first and second configurations simultaneously, the first and second data sets can be acquired simultaneously.

The simultaneous operation may relate to a simultaneous acquisition of data sets and to a simultaneous combination of the acquired data sets.

In some embodiments, the control unit is configured to provide that the operation of the scanning device in both the first and second configurations is started and stopped substantially at the same time.

In some embodiments, the control unit is configured to provide that the scanning device is operated continuously in the first configuration and/or in the second configuration, such that first and/or second data sets are acquired continuously. This may have the advantage that data can be acquired from surface areas which are larger than the area which can be viewed by the scanning device in one position of the integrated 3D scanner relative to the surface of an object. A number of first data sets may then be acquired covering different portions of the surface such that these first data sets can be used to provide a relatively low-resolution virtual 3D representation of the surface of the object.

A continued acquiring of data may also have the advantage that the integrated 3D scanner can be moved towards or away from the surface while simultaneously acquiring data sets relating to the surface.

In some embodiments, the control unit is configured to operate both the first and the second configuration continuously, while only combining acquired first and second data sets when the value of the first and/or second parameter indicates that the integrated 3D scanner is within the first and/or second range of distances, respectively.

In some embodiments, a condition must be fulfilled before the second configuration of the scanning device acquires the second data set relating to the surface of an object. This condition may relate to a distance from the surface and/or an orientation of the scanning device relative to the surface.

When the condition is fulfilled the control unit provides that the second configuration of the scanner device acquires at least one second data set.

The control unit may be capable of controlling the acquiring of the second data set based on the value of a first parameter derived from the first data set and/or from a representation of the first data set. The representation may comprise an image formed from the first data set, such as a 2D image of the surface, or a virtual 3D representation of the surface.

In some embodiments, the method comprises determining if the distance between the integrated 3D scanner and the surface is within the second range of distances based on the value of a first parameter relating to the first data set or based on a reading from a distance measurement unit of the integrated 3D scanner.

In some embodiments, the control unit is capable of controlling the operation of the scanner device based on the value of a first parameter derived from the first data set and/or from said first merged data set.

In some embodiments, the data processing unit is capable of forming a first virtual 3D representation of the surface from the acquired first data sets.

The first parameter may then be derived from this virtual 3D representation.

The first configuration of the scanning device may comprise a focus scanning unit which is capable of determining the distance between the integrated 3D scanner and the surface of an object, such that the first parameter may be this distance.

The integrated 3D scanner may be capable of deriving the value of the first parameter for changing distances between the integrated 3D scanner and the surface of an object.

In some embodiments, at least one boundary of the second range of distances is related to a threshold value of the first parameter. The boundary of the second range of distances may then be determined as the distance between the integrated 3D scanner and the surface at which the value of the first parameter reaches the threshold value.

The control unit may be adapted for monitoring the first parameter.

In some embodiments, the control unit is capable of deriving the value of the first parameter, such as deriving the value of the first parameter in real-time.

In some embodiments, the integrated 3D scanner comprises a storage unit for storing acquired first and second data sets.

In some embodiments the storage unit is part of the scanning device and the integrated 3D scanner comprises means for transferring acquired data from the storage unit to the data processor unit In some embodiments, the data processing unit comprises algorithms adapted for generating a first merged data set from a number of acquired first data sets.

In some embodiments, the data processing unit comprises algorithms adapted for generating a second merged data set from a number of acquired second data sets. These algorithms may be the same used for merging the first data sets.

In some embodiments, the data processing unit comprises algorithms adapted for combining the first merged data set and the second merged data set to provide said combined data set.

In some embodiments, the data processing unit comprises algorithms adapted for combining the first merged data set and the number of second data sets to provide said combined data set.

The control unit may thus provide that the value of the first parameter can be derived for changing relative positions and distances of the integrated 3D scanner and the surface of an object.

When operating continuously while the integrated 3D scanner is moved relative to the surface of an object, such as when the integrated 3D scanner approaches a surface of an object, the monitoring of the first parameter may provide information to the control unit of the integrated 3D scanner relating to when the integrated 3D scanner is at a distance where the second configuration of the scanning device is capable of acquiring the second data set relating to the object surface.

The control unit may be capable of determining from the value of the first parameter whether the scanning device is at a position relative to the surface of an object where the second configuration of the scanning device can obtain the second data set.

In some embodiments, the control unit is configured for deriving the first parameter. The control unit may comprise a designated data processor or utilize the data processor unit which combines the data sets, on which computer implemented algorithms are implemented such that the control unit can derive the first parameter from one or more first data sets.

The first parameter may in principle any parameter which adequately can describe a characteristic of a data set and/or of a virtual representation of a data set. When the representation of the first data set comprises an image of the surface, the first parameter may relate to a measure of the sharpness of the image, such as the contrast between different regions in the image. The image may be said to provide a sharp presentation of the object surface when individual structures in the surface can be distinguished.

In some embodiments, the data processing unit comprises an algorithm configured for determining the first parameter by utilizing a sharpness vs. distance function, where the sharpness vs. distance function describes the sharpness of an acquired first data set as a function of the distance between the integrated 3D scanner and the surface. The sharpness vs. distance function preferably has been measured prior to using the integrated 3D scanner, such that the distance can be determined by measuring the sharpness of the first data set and then applying the sharpness vs. distance function. The sharpness function may relate to at least one function selected from the group comprising of: estimating of image gray level variance and amplitude; computation of an intensity difference between adjacent pixels; standard edge-detection masks; and Fourier transforms.

In some embodiments, the first configuration is such that the scanning device is capable of acquiring the number of first data sets when the integrated 3D scanner is moved at distances from the surface within the first range of distances. First data sets may then be acquired when the integrated 3D scanner is moved relative to the surface such that first data sets are acquired from a larger area of the surface than the area viewed by the first configuration of the scanning device when the integrated 3D scanner is held at a fixed position relative to the surface.

In some embodiments, the second configuration is such that the scanning device is capable of acquiring the number of second data sets when the integrated 3D scanner is moved at distances from the surface within the second range of distances.

Second data sets may then be acquired when the integrated 3D scanner is moved relative to the surface, such that second data sets area acquired from a larger area of the surface than the area viewed by the second configuration of the scanning device when the integrated 3D scanner is held at a fixed position relative to the surface.

The first and second range of distances may have an overlapping range of distances.

In some embodiments, the scanning device is configured for simultaneously acquiring first data sets and second data sets when the integrated 3D scanner is at positions relative to the surface where the distance to the surface is in said overlapping range.

The integrated 3D scanner may be capable of changing the spatial resolution at which the first data set and/or the second data set is acquired. This change may be provided automatically, such as provided automatically based on the value of the first parameter and/or on a measured distance between the integrated 3D scanner and the object surface. The change in spatial resolution can be provided by changing between acquiring the data sets using different sensor elements with different spatial resolutions. Such a change between different sensor elements can be realized by inserting or removing a mirror from the beam path of the scanner device or by having a beam splitter in the beam path and using the control unit to alternate between acquiring from the one and the other sensor element. The size of an aperture in the beam path can also be changed such that the focal depth of the scanner device increases with decreasing aperture size.

In some embodiments, the scanning device comprises a first scanning unit which at least in part realizes the first configuration of the scanning device, where the first scanning unit may be capable of acquiring the first data set.

In some embodiments, the scanning device comprises a second scanning unit which at least in part realizes the second configuration of the scanning device where the second scanning unit may be capable of acquiring the second data set.

The first and second configurations of the scanning device may thus be realized by the first and second scanning units, respectively, and in the context of the present disclosure, the features described in relation to the configurations of the scanning device may also be considered to relate to these scanning units.

In some embodiments, the first and second scanning units are integrated in the integrated 3D scanner.

The control unit may be capable of automatically changing between acquiring data from the first scanning unit and the second scanning unit.

The scanning device may be capable of operating in further configurations, such as in a third configuration capable of acquiring a third data set relating to the surface of an object.

The third configuration of the scanning device may be such that the third data set comprises data with a spatial resolution, which differs from the spatial resolution of the first and second data sets.

The integrated 3D scanner may comprise further scanning units, such as a third scanning unit.

In some embodiments, the control unit is adapted to control the second scanning unit based on the value of the first parameter. In some embodiments, the control unit is adapted to control the third scanning unit based on the value of the first parameter.

In some embodiments, the integrated 3D scanner comprises an additional measuring device configured for performing at least one additional measurement.

The additional measuring device may comprise a distance measurement unit configured for measuring the distance from the integrated 3D scanner to the surface of an object, such as a distance measurement unit for time of flight measurement.

The distance may be measured from the integrated 3D scanner to said first and/or second portion of surface. The parameter derived from such a distance measurement may relate to the distance between the integrated 3D scanner and the surface of an object.

In some embodiments, the control unit is adapted to control the second configuration of the scanning device based on the distance to the surface as measured by the distance measurement unit.

In some embodiments, the control units is adapted to provide that acquiring of the first and/or second data sets is controlled based on the value of a parameter derived from the at least one additional measurement.

In some embodiments, the integrated 3D scanner is capable of detecting when it is within the second range of distances from the surface of an object.

This detection may be based on said additional measurement or on an analysis of the first and/or second data set.

The data processing unit may be configured for forming a virtual 3D representation of the data sets acquired with the scanning device and/or the combined data set.

In some embodiments, the integrated 3D scanner comprises a transfer unit configured for transferring data from the scanning device to the data processing unit.

The transfer unit may be an integrated part of the integrated 3D scanner.

The transfer unit may be configured to transfer the first data set acquired by the scanning device in its first configuration and/or to transfer the second data set acquired by the scanning device in its second configuration.

The first and second data set may relate to a first and second spatial distribution of electromagnetic signals, respectively.

The first configuration of the scanning device may comprise a first signal detecting unit capable of receiving and detecting electromagnetic signals from a first solid angle. If part of an object is arranged within this first solid angle, the scanning device may in its first configuration be capable of receiving these electromagnetic signals and thereby acquire the first data set comprising information relating to the surface of the object.

The second configuration of the scanning device may comprise a second signal detecting unit capable of receiving and detecting electromagnetic signals from a second solid angle.

If part of an object is arranged within this second solid angle, the scanning device may in its second configuration be capable of receiving these electromagnetic signals and thereby acquire the second data set comprising information relating to the surface of the object.

The first and second solid angles may be such that the first area is larger than the second area when the first and second distances are identical such that the first and second cross sectional planes are aligned.

The first and second solid angles may describe a conical or cylindrical shaped region in space over which the electromagnetic signals can be received by the scanner device.

The solid angle from which such a time of flight measurement collects electromagnetic signals may be larger than, smaller than, or substantially identical to the second solid angle.

When the time of flight measurement is in addition to the acquiring of data in the first configuration of the scanning device, the solid angle from which such a time of flight measurement collects electromagnetic signals may be larger than, smaller than, or substantially identical to the first solid angle.

The first and second signal detecting units may be comprised in the first and second scanning units, respectively.

The first and second detecting units may comprise an array of sensor elements capable of detecting electromagnetic signals and forming a data set from these electromagnetic signals.

In some embodiments, the array of sensor elements is the same in the first and second detecting units with the difference that when the array of sensor elements are part of the first detecting unit, the sensor elements are binned such that the spatial resolution provided by the array of sensor elements is reduced compared to when it functioning as part of the second detecting unit.

In some embodiments, the first solid angle is substantially identical to the second solid angle.

In some embodiments, the first solid angle is larger than the second solid angle.

The first and second data sets may be such that the data processing unit can form a first and a second virtual 3D representation of the surface from the electromagnetic signals received by the first and second signal detecting units, respectively.

When part of an object's surface is arranged in the first solid angle, the first virtual 3D representation may provide information relating to the object surface. This may require that the integrated 3D scanner and the object are arranged at a first distance or in a first distance range from each other.

In some embodiments, the data processing unit is configured for performing a registration of the second data set into the first data set, or vice versa.

In some embodiments, the data processing unit is configured for performing a registration of a representation of the second data set into a representation of the first data, or vice versa.

In some embodiments, the data processing unit is configured for performing a registration of said second merged data set into said first merged data set, or vice versa.

In some embodiments, the data processing unit is configured for providing a stitching of acquired or merged data sets as part of the combining of these data sets.

In some embodiments, the first configuration is capable of acquiring a first data set which comprises a point-cloud relating to a first portion of the scanned surface. This can be the case when the first configuration is capable of capturing electromagnetic radiation from a first volume in such a manner that 3D dimensional characteristics of a surface arranged in said first volume are recorded. This can be achieved e.g. by manipulating optical elements in the first configuration such as is done in a focus scanner or a triangulation based laser scanner.

In some embodiments, the first configuration is such that a point-cloud relating to a first portion of the scanned surface can be formed from the number of first data sets. The first data sets may e.g. comprise a stack of images acquired at different vertical positions relative to the surface of the object, and from this stack of images, the point cloud may be generated. From such a point cloud a first virtual 3D model of the first portion of the surface can be realized.

In some embodiments, the second configuration is capable of acquiring a second data set which comprises a point-cloud relating to a second portion of the scanned surface. This can be the case when the second configuration is capable of capturing electromagnetic radiation from a second volume in such a manner that 3D dimensional characteristics of a surface arranged in said second volume are recorded. This can be achieved e.g. by manipulating optical elements in the second configuration such as is done in a focus scanner or a triangulation based laser scanner.

In some embodiments, the second configuration is such that a point-cloud relating to a second portion of the scanned surface can be formed from the number of second data sets. The second data sets may e.g. comprise a stack of images acquired at different vertical positions relative to the surface of the object, and from this stack of images, the point cloud may be generated.

The second data sets may e.g. comprise a stack of images acquired at different vertical positions relative to the surface of the object, and from this stack of images, the point cloud may be generated. From such a point cloud a second virtual 3D model of the second portion of the surface can be realized.

In some embodiments, the data processing unit comprises a data storage medium for storing a number of first data sets and/or for storing a number of second data sets at least temporarily.

In some embodiments, the data processing unit comprises computer algorithms for combining the number of first data sets to generate a first virtual 3D representation, e.g. of a structure on a surface, from these first data sets. The first data sets may be stored as corresponding points clouds In some embodiments, the combining algorithms are adapted to provide a registration of the point clouds into a common reference system e.g. by applying an iterative closest point algorithm, thereby generating the first virtual 3D representation are from these first data sets.

In some embodiments, the data processing unit comprises a data storage medium for storing a number of second data sets at least temporarily, and computer algorithms for combining the number of second data sets to generate a second virtual 3D representation, e.g. of a structure on a surface, from these second data sets.

In some embodiments, the second data sets are stored as corresponding points clouds, and the combining algorithms are adapted to provide a registration of the point clouds into a common reference system e.g. by applying an iterative closest point algorithm, such that the second virtual 3D representation can be generated from these second data sets.

In some embodiments, the first and second data sets are stored as corresponding points clouds, and the combining algorithms are adapted to provide a registration of the point clouds into a common reference system e.g. by applying an iterative closest point algorithm, such that the virtual 3D representation can be generated.

The data processing unit may comprise components and computer code configured for performing algorithms relating to said registration. Such registration algorithms may be classified into intensity-based and feature-based. When the registration is of a second data set into a first data set, the first data set may be referred to as the reference or source data set, and the second data set may be referred to as the target or sensed data set. The registration may then involve spatially transforming the second data set (target data set) to align with the first data set (reference data set) In Intensity-based registration methods intensity patterns in images are compared via correlation metrics, while in feature-based methods a correspondence between image features such as points, lines, and contours is found.

Intensity-based methods may register entire data sets (such as entire images) or parts of the data set. If parts of a data set are registered, centers of corresponding parts are treated as corresponding feature points.

Feature-based methods establish a correspondence between a number of points in the data sets. Knowing the correspondence between a number of points, a transformation is then determined to map the target data set to the reference data set, thereby establishing point-by-point correspondence between the reference and target data sets.

The skilled person will know how to design a data processing device, which is capable of performing such a registration.

In some embodiments, the data processing unit is an integrated part of the integrated 3D scanner.

Such a design may be advantageous when the data processing unit is faster at processing the data acquired in the first and/or second configuration than the rate at which these data can be transferred to an external located data processing unit. For many applications it is advantageous to have a real-time confirmation of the quality of a scanning such that an operator continuously can be informed of the quality of data sets relating to the different scanned portions of the surface. The operator may for instance be informed whether the quality of the acquired data set is sufficiently high, such that he can proceed to scanning another portion of the surface, or whether the quality is poor such that more scanning at the present location is required.

In some embodiments, the data processing unit is arranged separately from the integrated 3D scanner.

Such a design may be advantageous when the transfer unit can transfer data fast to a powerful external data processing unit.

In some embodiments, the integrated 3D scanner comprises a memory unit capable of storing the first and/or second data sets, such that the acquired first and second data sets and/or the combined data set can be transferred after the scanning is performed.

Such a memory function may have the advantage that large amounts of data can be acquired and processed without the need for transferring data to an external device until after the scanning.

The transfer unit may be configured for a wireless or a wired transmission of data to the data processing unit.

In some embodiments, the scanning device comprises an optical system. The optical system may be capable of receiving electromagnetic signals and transmitting these to the first and/or second signal detecting units.

The optical system may comprise a number of optical components. In some embodiments, some of the optical components are part of both the first and second configurations of the scanning device.

The first and second scanning units may share a number of optical components.

In some embodiments, the first and second configurations are provided by substantially the same optical components such that electromagnetic radiation from the object surface travels through the same optical components and e.g. are recorded by the same sensor element. The difference between the first and second configurations may then be the relative positions of the optical components in the two configurations. A lens or a lens system may e.g. be displaced relative to the other optical components, or lenses in a lens system may be displaced relative to each other such that position of a focal of the scanner device changes. In one relative position the first configuration is provided while in another relative position of the lenses, the second configuration is provided.

In some embodiments, the optical systems of the first and second configuration are independent systems which do not share any optical components.

The first and/or second scanning unit may comprise an array of sensor elements. Such an array of sensor elements may be capable of detecting electromagnetic signals and forming a data set from these electromagnetic signals.

The first configuration of the scanning device may be adapted to acquire first data sets which can be used for a time of flight type of measurement. The data processing unit may be capable of deriving the distance between the integrated 3D scanner and the surface of an object.

In some embodiments, the integrated 3D scanner is capable of detecting when it is within the second range of distances from the surface of an object.

This detection may be based on said additional measurement or on an analysis of the first and/or second data set.

The first configuration and/or the second configuration of the scanning device may be adapted to provide a focus scanning of the surface.

In some embodiments, the first and/or second scanning unit comprises a 3D focus scanning unit, adapted for 3D focus scanning of a surface.

The 3D focus scanning unit may be configured to perform a non-contact 3D scanning of an object by obtaining a series of images for different focus planes on the object and determining in-focus regions for the obtained images. This may be done by means of a camera and imaging optics where the focus plane on the object can be varied. The in-focus data may be transformed into 3D real world coordinates thereby obtaining a 3D surface or 3D model of the object. For the purpose of 3D scanning it may be advantageous to obtain images with a shallow depth-of-field so that in-focus positions are determined with high accuracy The 3D focus scanning unit may comprise:

a probe light device capable of generating a probe light, and optical components for transmitting probe light towards an object such that the first and/or second scanner unit is capable of illuminating at least a part of the surface of the object;

a camera comprising an array of sensor elements, and optical components for transmitting light returned from the object surface to the array of sensor elements.

an optical system for imaging with a first depth-of-field on the camera at least part of the transmitted light returned from the object surface to the array of sensor elements, means for varying the position of the focus plane relative to the optical system, such that the position of the focus plane relative to an object can be adjusted, means for obtaining at least one image from said array of sensor elements, means for determining the in-focus position(s) of:

each of a plurality of the sensor elements for a range of focus plane positions, or each of a plurality of groups of the sensor elements for a range of focus plane positions, and means for transforming the in-focus data into 3D coordinates;

The 3D focus scanning unit may further comprise:

means for selecting a portion of light rays returned from the object, where the light rays have been transmitted through at least a part of the optical system; and a further camera for capturing at least some of the selected light rays with a second depth-of-field substantially larger than the first depth-of-field.

The first and/or the second scanner unit may be adapted to perform a scanning by means of laser light scanning, white light scanning, probe-scanning, X-ray scanning, and/or CT scanning.

The integrated 3D scanner may comprise a source of electromagnetic signals, where the source is arranged such that a surface of an object can be exposed to the electromagnetic signals emitted by the source and such that electromagnetic signals reflected or emitted from the exposed area of the surface can be received by the scanning device. The source may comprise a monochromatic source, a source emitting electromagnetic signals at a number of discrete wavelengths or wavelength ranges, or a broadband source. The electromagnetic signals may have a wavelength in the X-ray range, in the infrared range, in the visual range or in the ultraviolet range of wavelengths. The source may be is arranged such the emitted electromagnetic signals propagate along or substantially parallel with the optical axis of the first and/or second configuration from the integrated 3D scanner.

In some embodiments, the ratio between the spatial resolution of the first data set and of the second data set is below a resolution factor.

The ratio between the spatial resolutions provided by the first configuration and the second configuration of the scanning device may be below the resolution factor.

In some embodiments, the ratio between the spatial resolutions provided by the first scanning unit and the spatial resolution provided by the second scanning unit may be below the resolution factor.

The resolution factor may be below about 0.8, such as below about 0.6, such as below about 0.5, such as below about 0.4, such as below about 0.3, such as below about 0.2, such as below about 0.1, such as below about 0.05, such as below about 0.02, such as below about 0.01, such as below about 0.005, such as below about 0.0025, such as below about 0.001, such as below about 0.0005, such as below about 0.0001.

The first and the second configurations of the scanning device may both be capable of providing data sets at variable resolutions, such that e.g. the first configuration may provide first data sets in at least two different resolutions.

In some cases, the resolution may be measured as pixels per cm, as pixels per $cm^2$, or as dots per inch. This is for instance the case when the first and/or second data sets comprise an image of the surface, and/or when a 3D image is formed from acquired data sets.

The object may in principle be any object that can provide or reflect electromagnetic signals or any other signal that can be detected, such as acoustic waves.

The integrated 3D scanner provides an advantage over prior art scanners in that the scanning device can be operated in two configurations, where these configurations may provide a scanning of the surface of an object, and where the data acquired with the scanning device in the first and second configurations can be combined by a data processing unit.

The object may comprise a surface in which a number of structures distributed over the surface. For some scanners, the structures must preferably be located relatively close compared to the area of the surface which the scanning device can view, such that the scanning device at all times can capture signals from at least one structure when scanning across the surface.

If the structures are arranged with large distances to the nearest neighbor, the relative positions of the structures may not be determined precisely. This may especially be true when the surface between the structures is highly uniform, such that the movement of the integrated 3D scanner relative to the surface is difficult to observe with the scanning device.

The distance between the scanning device and the surface of an object may be measured along the first and/or second optical axis of the scanning device.

The distance between the scanning device and the surface of an object may be measured along an axis connecting the scanning device to a center of the first or second portion of the surface, when the surface is arranged at the first or second focal plane, respectively.

In a first cross sectional plane arranged perpendicular to the first optical axis of the first configuration of the scanning device the first solid angle may cover a first area at a first distance from the integrated 3D scanner.

In a second cross sectional plane arranged perpendicular to the second optical axis of the second configuration of the scanning device the second solid angle may cover a second area at a second distance from the integrated 3D scanner.

In some embodiments, the scanning device in the first configuration is capable of receiving data relating to a first portion of the surface when the integrated 3D scanner is arranged in a first position relative to the surface.

In some embodiments, the scanning device in the second configuration is capable of receiving data relating to a second portion of the surface when the integrated 3D scanner is arranged in a second position relative to the surface.

The second portion may be substantially identical to the first portion.

In some embodiments, the scanning device is such that the first and second configurations receive signals from substantially the same portion of the surface of the object when the integrated 3D scanner is arranged in a fixed position relative to the surface of the object. The optical system and/or the signal detecting units of the second configuration may then be adapted to receive and detect signals in a higher spatial resolution from said same portion of the surface than the first configuration.

The second detection device may be capable of detecting electromagnetic signals in a higher resolution than the first detection device. For instance the second detection device may be capable of detecting images in a resolution of 3 mega pixels, while the first detection device may be capable of detecting images in a resolution of 1 mega pixels for the same area.

The first portion may be larger than the second portion, such that the first portion covers a larger area of the surface than the second portion.

The second portion may be at least partly embedded in the first portion, such that in coinciding first and second cross sectional planes, the first portion surrounds the second portion.

In some embodiments, the ratio between the area of the second portion and the area of the first portion of the surface is below a portion area factor.

The portion area factor may be below about 0.8, such as below about 0.6, such as below about 0.5, such as below about 0.4, such as below about 0.3, such as below about 0.2, such as below about 0.1, such as below about 0.05, such as below about 0.02, such as below about 0.01, such as below about 0.005, such as below about 0.0025, such as below about 0.0001, such as below about 0.0002, such as below about 0.0001.

In some embodiments, the data processor unit or a second data processor unit is configured for executing algorithms for generating a virtual 3D representation of the surface based on the combined data.

In some embodiments, the data processing unit is capable of forming a first virtual 3D representation of the surface from the acquired first data sets, such as from the first merged data set, or wherein the first merged data set is a first virtual 3D representation of the surface.

In some embodiments, the first parameter is derived from this virtual 3D representation.

In some embodiments, the data processing unit is capable of forming a second virtual 3D representation of the surface from the acquired second data sets, such as from the second merged data set, or wherein the second merged data set is a first virtual 3D representation of the surface.

In some embodiments, the data processing unit is capable of forming a virtual 3D representation of the surface from the combined data set, or wherein the combined data set is a virtual 3D representation of the surface.

In some embodiments, the first configuration is such that each acquired first data set comprises a point cloud, and/or wherein the second configuration is such that each acquired second data set comprises a point cloud.

In some embodiments, the data processing unit comprises algorithms for combining point clouds relating to different portions of the object surface to provide a virtual 3D representation of the object surface from a number of data sets.

In some embodiments, the combined data set is a virtual 3D representation of the object surface, and where the algorithms for combining point clouds are capable of combining point clouds acquired by the first and second configurations to provide said combined virtual 3D representation. One way of combining point clouds is to bring them into a common reference system, a process often referred to as registration, and then combine the point clouds in the common reference system to create a combined virtual 3D representation of the surface.

In some embodiments, the control unit is capable of controlling the operation of the scanner device based on the value of a second parameter derived from the second data set and/or from said second merged data set.

In some embodiments, the control unit is capable of providing that the first configuration of the scanner device acquires data from the object surface when the second parameter is outside a given interval. Outside this interval, no structures can be identified in the second data set or in said second merged data set, i.e. no geometrical information of the surface can be derived therefrom.

In some embodiments, the combined data set comprises a virtual 3D representation of the surface.

The data processing device may be capable of merging information from a number of data sets into a representation of e.g. a structure on the surface of an object. In some cases a number of first data sets are merged, such as 5, 10, 12, 15, 20, 30, 40, 50, 60, 70, 80, 90 or in some cases even hundreds, from many different directions may be required to obtain information about a structure.

In some embodiments, the first and/or the second data sets are brought into a common reference system, a process that may be called alignment or registration, and then merged to create a complete virtual 3D model of the surface.

In some embodiments, at least part of the integrated 3D scanner is adapted for use as a handheld scanner.

In some embodiments, the control unit is configured for controlling the acquiring of first data sets with the first configuration and/or the acquiring of second data sets with the second configuration based on the value of a second parameter derived from the second data set.

In some embodiments, the control unit is configured for controlling the acquiring of first data sets with the first scanning unit and/or the acquiring of second data sets with the second scanning unit based on the value of a second parameter derived from the second data set.

In some embodiments, the first and second configurations are mutually calibrated, such as calibrated to compensate for an offset between the locations on the scanner device at which the first and second configurations receive electromagnetic signals from the object surface. When combining the first and second data sets, this mutual calibration can be taken into account such that a correct combination is obtained. The calibration may be hardware or software implemented.

In one hardware implemented calibration, the relative orientation of the first and second scanner units may be adjusted to provide that their fields of view intersect at a preferred distance from the scanner device.

In software implemented calibration, the calibration may be performed during the combination of the first and second data sets based on a previously performed measurement of the offset between the locations. The measured offset is then taken into account e.g. in a registration of the second data set into the first data set, such that the first and second data sets are offset corresponding to the offset between the locations.

In some embodiments, the second configuration provides a zooming into a smaller second portion of the surface compared to the first portion of the surface scanned in the first configuration.

The scanning device may be adapted to provide the zooming while the integrated 3D scanner is at a fixed position relative to the object.

In some embodiments, the portion of a surface that can be viewed by the scanning device is larger in the first configuration than in the second configuration.

In the context of the present disclosure, the phrase "viewing a portion of a surface" may refer to the case where electromagnetic signals can be received by a scanning unit from this portion of the surface when the integrated 3D scanner is held in a fixed position relative to the surface. The phrase may refer to the case where the relative arrangement of the scanning unit and the surface of an object are such that the electromagnetic signals received from the viewed portion can be used to provide a representation wherein structures on the surface can be identified.

The first scanning unit may be configured for viewing the first portion of the surface.

The second scanning unit may be configured for viewing the second portion of the surface.

The ratio between the area of a portion viewed by the first scanning unit and the area viewed by the second scanning device is below a view area factor.

The view area factor may be below about 0.8, such as below about 0.6, such as below about 0.5, such as below about 0.4, such as below about 0.3, such as below about 0.2, such as below about 0.1, such as below about 0.05, such as below about 0.02, such as below about 0.01, such as below about 0.005, such as below about 0.0025, such as below about 0.001, such as below about 0.0005, such as below about 0.0001.

The integrated 3D scanner is capable of scanning a surface an object, where the formed first and second data set may relate to representations of the surface obtained at different spatial resolutions.

The first and second configuration of the scanning device may be capable of acquiring a relatively low-resolution data set and a relatively high-resolution data set, respectively, from a surface of an object.

A virtual 3D representation of the scanned surface of the object may be obtained in a relatively high-resolution from the relatively high-resolution data sets by merging two or more of these data sets.

This may however introduce some distortion in the generated virtual 3D representation as described elsewhere herein. This may e.g. occur when some of the data sets do not include a well-defined structure that can be used as landmark/anchor in the merging of data sets.

A virtual 3D representation of the scanned surface of the object may be obtained in a relatively low resolution by merging the relatively low-resolution data set.

The virtual 3D representations of the scanned surface obtained in the low-resolution and in the high-resolution may then be merged into a combined virtual 3D model.

The relatively high-resolution data may be merged directly to the virtual 3D representation obtained from the relatively low-resolution data. Thereby the relative position of the relatively high-resolution data acquired with the second configuration is determined by the spatial resolution of the virtual 3D representation obtained from the relatively low-resolution data.

The first configuration of the scanning device may be such that when a surface of an object is arranged at the first focal plane, the first spatial distribution of electromagnetic signals provides a first representation of the surface in the first spatial resolution. Further, the second configuration of the scanning device may be such that when a surface of an object is arranged at the second focal plane, the second spatial distribution of electromagnetic signals provides a second representation of the surface which has the second spatial resolution.

The integrated 3D scanning device may define a first optical axis along which electromagnetic signals can travel from the first focal plane to be received by the scanning device in the first configuration.

The integrated 3D scanning device may define a second optical axis along which electromagnetic signals can travel from the second focal plane to be received by the scanning device in the second configuration The first focal plane may be perpendicular to the first optical axis of the scanning device in the first configuration.

The second focal plane may be perpendicular to the second optical axis of the scanning device in the second configuration.

The first and second focal planes may extend for some depth along the first and second optical axes, respectively. These focal lengths may be determined by the design of the optical system in the two configurations.

In one embodiment, the focal depth at the second focal plane is smaller than the focal depth at the first focal plane, such as smaller with a factor of about 2, such as a factor of about 3, such as a factor of about 5, such as a factor of about 7, such as a factor of about 10, such as a factor of about 15, or such as a factor of about 20, In some embodiments, the scanning device in the first configuration is capable of receiving the first spatial distribution of electromagnetic signals from a first portion of the surface of an object.

In some embodiments, the scanning device in the second configuration is capable of receiving the second spatial distribution of electromagnetic signals from a second portion of the surface of an object.

The first and second focal planes may be arranged at first and second distances from the integrated 3D scanner, respectively.

The first distance and the second distance may be substantially identical.

The first distance may be larger than the second distance.

In some embodiments, the second configuration provides a zooming such that the size of the area viewed by the scanning device in the second focal plane in the second configuration is smaller than the size of the area viewed by the scanning device in the first focal plane in the first configuration.

The scanning device and the data processing unit may be integrated in the integrated 3D scanner.

The first and/or second configuration of the scanning device may comprise a 3D scanner unit.

Scanning the surface of an object using a 3D scanner for obtaining a three dimensional representation of the surface of the object may also be denoted 3D modeling, which is the process of developing a mathematical representation of the three-dimensional surface of the object via specialized software. The product is called a 3D model. A 3D model represents the 3D object using a collection of points in 3D space, connected by various geometric entities such as triangles, lines, curved surfaces, etc. The purpose of a 3D scanner is often to create a point cloud of geometric samples on the surface of the object.

3D scanners may collect distance information about surfaces within its field of view. The "picture" produced by a 3D scanner describes the distance to a surface at each point in the picture.

For most situations, a single data set will not produce a complete model of the object. Multiple data sets, such as 5, 10, 12, 15, 20, 30, 40, 50, 60, 70, 80, 90 or in some cases even hundreds, from many different directions may be required to obtain information about all surfaces of the object or a structure on the surface. These data sets are brought in a common reference system, a process that may be called alignment or registration, and then merged to create a complete model.

One type of 3D scanner is the triangulation 3D laser scanner which uses laser light to probe the environment or object. A triangulation laser shines a laser on the object and exploits a camera to look for the location of the laser dot. Depending on how far away the laser strikes a surface, the laser dot appears at different places in the camera's field of view. This technique is called triangulation because the laser dot, the camera and the laser emitter form a triangle. A laser stripe, instead of a single laser dot, may be used and is then swept across the object to speed up the acquisition process.

Structured-light 3D scanners project a pattern of light on the object and look at the deformation of the pattern on the object. The pattern may be one dimensional or two dimensional. An example of a one dimensional pattern is a line. The line is projected onto the object using e.g. an LCD projector or a sweeping laser. A camera, offset slightly from the pattern projector, looks at the shape of the line and uses a technique similar to triangulation to calculate the distance of every point on the line. In the case of a single-line pattern, the line is swept across the field of view to gather distance information one strip at a time.

An example of a two-dimensional pattern is a grid or a line stripe pattern. A camera is used to look at the deformation of the pattern, and an algorithm is used to calculate the distance at each point in the pattern. Algorithms for multistripe laser triangulation may be used.

The present disclosure relates to different objects including the integrated 3D scanner and the method described above and in the following, and corresponding methods, devices, apparatuses, systems, uses and/or product means, each yielding one or more of the advantages described in connection with the object of the disclosure, and the embodiments described in connection with the mentioned object and/or disclosed in the appended claims.

In some embodiments, the method comprises controlling the configuration in which the scanning device operates.

The controlling of the configuration of the scanning device may comprise changing between operating the scanning device in the first configuration and in the second configuration.

The controlling of the configuration of the scanning device may comprise changing between operating the scanning device in the first and second configurations simultaneously and operating the scanning device in the first or second configuration only.

A number of first data sets and/or a number of second data sets may be acquired in the method.

In some embodiments, the scanning device acquires a number of first data sets while the integrated 3D scanner and the object are moved relative to each other.

In some embodiments, the first configuration provides a view of a relatively larger portion of the surface of the object when the integrated 3D scanner is arranged at a distance within the first range of distances from the surface of the object, and wherein the second configuration provides a view of a relatively smaller portion of the surface of the object when the integrated 3D scanner is arranged at a distance within the second range of distances from the surface of the object.

In some embodiments, the method comprises acquiring first data sets when the integrated 3D scanner and the object approach each other, and second data sets may be acquired when the integrated 3D scanner and the object are spaced apart by a distance which is within the second range of distances.

In some embodiments, at least one boundary of the second range of distances is determined as the distance between the integrated 3D scanner and the surface at which the value of the first parameter reaches the threshold value. The threshold value may have a preset value or be provided by a user.

In some embodiments, the second data sets are automatically acquired when the integrated 3D scanner is within the second range of distances.

In some embodiments, the acquiring of second data sets is automatically stopped when the integrated 3D scanner is moved away from the object surface such that it no longer is within the second range of distances.

In some embodiments, the combination of first and the second data sets is configured to provide that the combined data set provides a registration of the second data sets into the first data sets.

The first data set may be acquired while maintaining the relative position of the object and the integrated 3D scanner, such that the first data set is acquired without moving e.g. the integrated 3D scanner relative to the object.

The second data set may be acquired while maintaining the relative position of the object and the integrated 3D scanner, such that the second data set is acquired without moving e.g. the integrated 3D scanner relative to the object.

In some embodiments, the scanner system comprises an external positioning system configured to determine the position and/or orientation of the integrated 3D scanner relative to the surface of the object.

In some embodiments, the integrated 3D scanner comprises a non-transitory computer readable medium having one or more computer instructions stored thereon, where said computer instructions comprises instructions for controlling the operation of the configurations of the scanning device when acquiring one or more first and one or more second data sets, and instructions for combining the one or more first and the one or more second data sets to obtain the combined dataset.

Disclosed is a computer program product comprising program code means for causing a data handling system to perform the method of the present disclosure when said program code means are executed on the data handling system.

The computer program product may comprise a computer-readable medium having stored there on the program code means.

Disclosed is a nontransitory computer readable medium storing thereon a computer program, where said computer program is configured for causing computer-assisted scanning of an object using the integrated 3D scanner according to the present disclosure.

The disclosure may relate to a computer program product comprising program code means for causing a data processing system to perform the method according to any of the embodiments, when said program code means are executed on the data processing system, and a computer program product, comprising a computer-readable medium having stored there on the program code means.

In the claims and the description the integrated 3D scanner is described in relation to the scanning of the surface of an object. The scanning device may however also be adapted to allow for the scanning of an interior structure in the object in one of its configurations. The first configuration may e.g. be adapted to provide a scanning of the surface of the object, while the second configuration may be capable of acquiring data relating to an internal structure, such as with an X-ray imaging device.

BRIEF DESCRIPTION OF THE DRAWINGS

The above and/or additional objects, features and advantages of the present invention, will be further elucidated by the following illustrative and non-limiting detailed description of embodiments of the present invention, with reference to the appended drawings, wherein.

In the following description, reference is made to the accompanying figures, which show by way of illustration how the disclosure may be practiced.

DETAILED DESCRIPTION OF PREFERRED EMBODIMENTS

Figure 1:
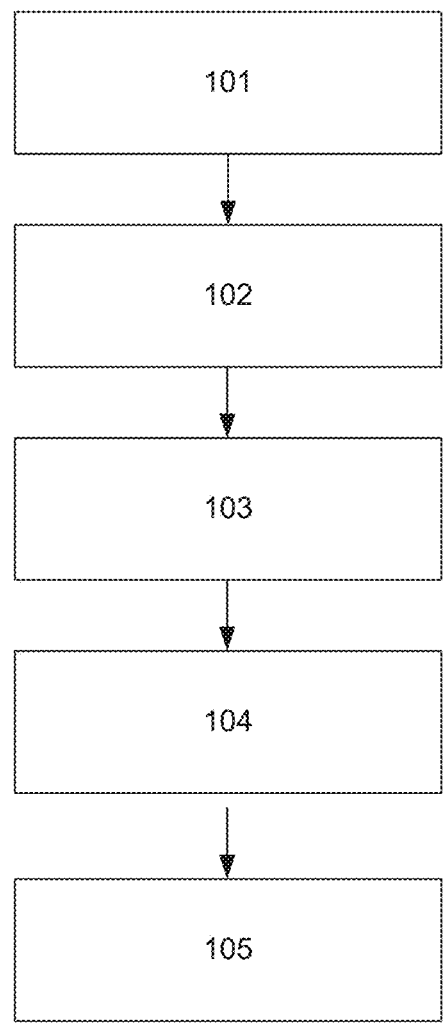
FIG. 1 shows an example of a flow chart of a method for scanning the surface of an object using the integrated 3D scanner.

In device claims enumerating several units or devices, several of these units or devices can be embodied by one and the same item of hardware. The mere fact that certain measures are recited in mutually different dependent claims or described in different embodiments does not indicate that a combination of these measures cannot be used to advantage.

Several of the figures show a cross sectional presentation of the situation, which often is a 3D situation where the object surface and the areas viewed by the scanning device extends over a length along an axis perpendicular to the cross section seen in the figures.

Although some embodiments have been described and shown in detail, the invention is not restricted to them, but may also be embodied in other ways within the scope of the subject matter defined in the following claims. In particular, it is to be understood that other embodiments may be utilized and structural and functional modifications may be made without departing from the scope of the present invention.

The integrated 3D scanner of the present disclosure is an improvement over prior art scanners as will be illustrated in the following example of the use of the integrated 3D scanner.

In the example, the surface has a first and a second structure that are separated by a distance which is larger than the area viewed by the second configuration of the scanning device when the scanner device is arranged at a distance from the object surface within the second range of distances where the second configuration can acquire second data sets that provide useful geometrical information from the surface.

When initiating the scanning of the surface of the object, the integrated 3D scanner is arranged at a distance within the first range of distances viewing the first structure of the surface. The integrated 3D scanner is operating in the first configuration and is moved by the operator towards the surface while maintaining the first structure in the area viewed by the first configuration. During the movement towards the surface, the first configuration of the scanning device continuously acquires first data sets relating to the surface, and the data processing unit forms a large-area low-resolution virtual 3D representation of the area viewed by the first configuration.

In embodiments of the integrated 3D scanner comprising a distance measurement unit, the reading from this may be used to determine when the integrated 3D scanner is within a distance in the second range of distances from the object surface.

In embodiments where the integrated 3D scanner is capable of deriving a first parameter and using this to determine when the integrated 3D scanner is within a distance in the second range of distances from the object surface, the value of the first parameter may be derived in real-time from the first data sets or from the formed relatively low-resolution virtual 3D representation of the surface, such that the first parameter can be monitored by the control unit.

The monitoring of the first parameter hence provides information to the integrated 3D scanner relating to when the integrated 3D scanner is at a distance where the second configuration of the scanning device is capable of acquiring the second data set.

When at a distance within the second range of distances, the second configuration may start acquiring second data sets. The acquiring of first data sets using the first configuration may continue while the second configuration acquires data.

While the integrated 3D scanner is within the second range of distances from the surface, the second configuration acquires second data sets relating to the first structure of the surface. When sufficient second data sets have been acquired from the first structure, the integrated 3D scanner is moved to a position where the second structure can be scanned using the second configuration of the scanning device.

The movement to the second structure may comprise a movement away from the surface, such that the integrated 3D scanner eventually is at a distance outside said second range of distances and the second configuration stops acquiring data. The integrated 3D scanner is then moved towards the surface where the second structure is located and similar to the approaching of the first structure the second configuration then starts acquiring data again when the integrated 3D scanner is sufficiently close to the surface. The position at which the second configuration should stop acquiring data may also be determined from the value of a second parameter derived from the second data set or from a distance measurement provided by a distance measurement unit of the integrated 3D scanner.

This movement to the second structure may also comprise movement along the surface at substantially a constant distance to the surface, such that the second configuration continues to acquire data during the movement. During this movement the first configuration of the scanning device may continuously acquire first data sets which may be used to generate the relatively low-resolution resolution virtual 3D representation.

The second data sets obtained at the first and second structures are used to form relatively high-resolution virtual 3D representations of these structures. The high-resolution virtual 3D representations can then be combined with the low-resolution virtual 3D representation formed from the first data sets by the data processing unit.

The result is a virtual 3D model of the surface where the first and second structures are seen in a high-resolution while the accuracy of the their relative position is limited by the resolution of the scanning device in the first configuration rather than an accumulated stitching error caused by inaccurate alignment of individual second data sets.

FIG. 1 shows an example of a flow chart of a method for scanning the surface of an object using the integrated 3D scanner.

In step 101 the integrated 3D scanner is initially arranged at a distance within the first range of distances in such a manner that data relating to a first structure on the surface can be acquired by the first configuration of the scanning device. The integrated 3D scanner is then moved towards the surface while the first configuration continuously acquires first data sets.

In step 102 the value of the first parameter or the reading from a distance measurement unit of the integrated 3D scanner indicates that the integrated 3D scanner has reached a position within the second range of distances from the surface such that the second configuration can acquire data relating to the surface. The first structure on the surface is then scanned in a high-resolution using the second configuration.

In step 103 the scanning of a first structure using the second configuration is done and the integrated 3D scanner is moved to a second structure which also is to be scanned using the second configuration. The movement may be along the surface or by moving the integrated 3D scanner away from the surface at the first structure and towards the surface at the second structure. It may be advantageous to move the integrated 3D scanner away from the surface when the distance between the structures on the surface exceeds the size of the portion of the surface which can be viewed by the scanning device in the first configuration. When moving the integrated 3D scanner away from the surface this portion may increase to cover both the first and second structures while still being able to acquire data sets that provide geometrical information relating to the object surface.

In step 104 the second structure on the surface is scanned in a high-resolution using the second configuration.

In step 105 the data processing device combines the first and second data sets such that the combined data set is obtained. The combined data set may provide a virtual 3D representation of the scanned surface wherein the first and second structures are seen in a higher resolution than the part of the object surface between the structures. The data sets may be combined during the scanning or after the scanning.

FIG. 2 illustrates a use of the integrated 3D scanner.

The second configuration of the scanning device may be adapted for acquiring a second data set which provides a high-resolution representation of the surface of an object. Often such scanners are only capable of receiving electromagnetic signals from a limited area of the surface such that each second data set may relate only to a fraction of the area of a given structure on the surface.

The whole structure on the surface can then be scanned by moving the scanner relative to the surface and acquiring a number of second data sets relating to overlapping sections of the surface. The acquired second data sets can then be combined to provide a data set relating to the entire structure. A precise combination of the number of second data sets requires that a precise alignment of the individual second data sets relative to each other can be established.

Some objects have surfaces where a number of structures preferably should be scanned with a high spatial resolution, while the areas between the structures have little or no structure which can be used by the second configuration of the scanning device to provide a precise alignment in the combination of the second data sets. In such cases can large errors occur in the relative position of the structures in a virtual 3D representation of the surface formed from a number of second data sets. The errors in the relative position may accumulate over the surface and become significant.

Figure 2A:
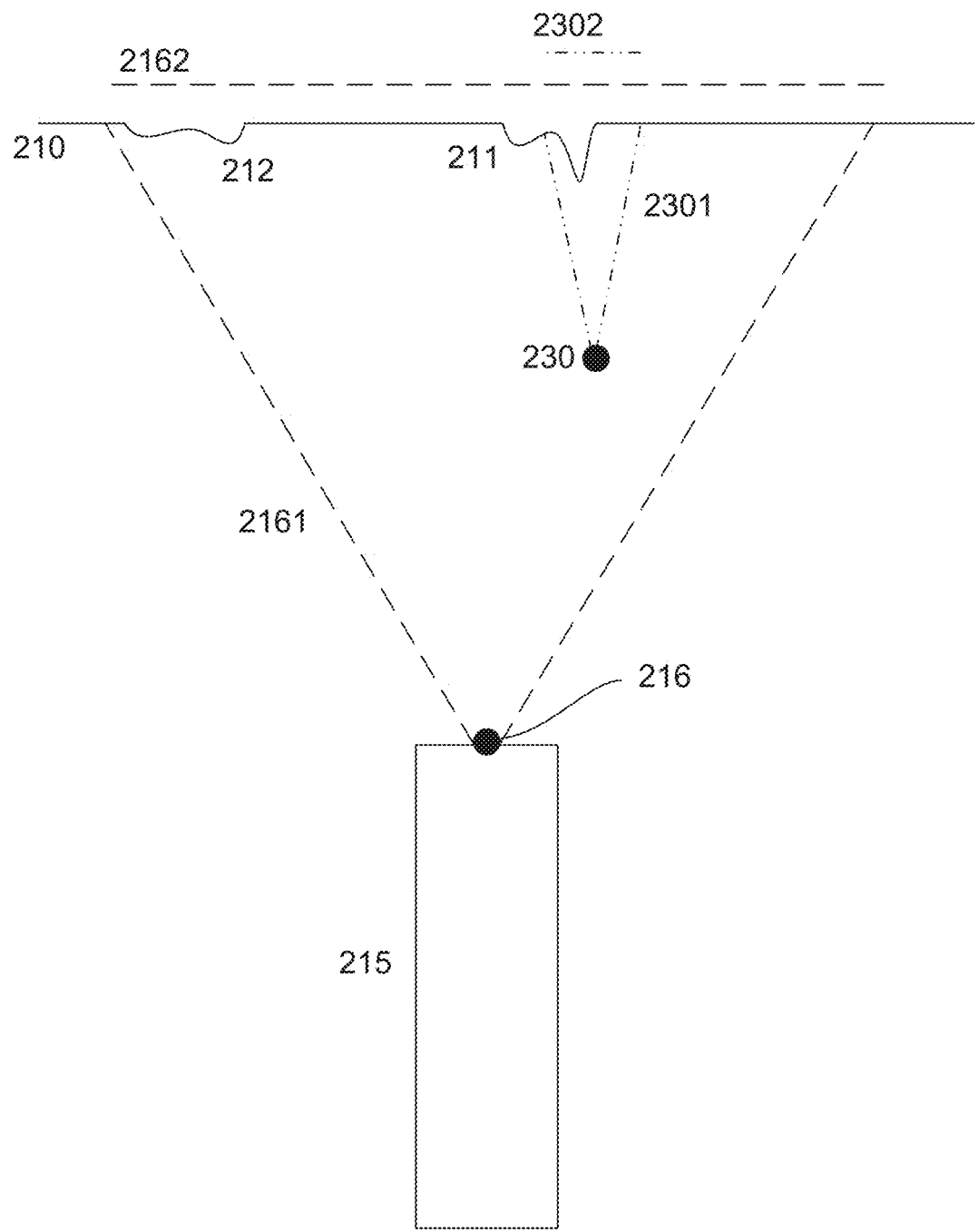
FIGS. 2a and 2b illustrate use of the integrated 3D scanner.

The integrated 3D scanner may solve this problem as illustrated in FIG. 2a.

The surface 210 of the object to be scanned has a first structure 211 and a second structure 212 which both are to be scanned using the second configuration of the scanning device. Between the two structures 211, 212 the surface has no structures which can be used to provide a precise combination of second data sets acquired from different portions of the surface.

When the integrated 3D scanner 215 is arranged at a position within the first range of distances, electromagnetic signals received by the scanning device in the first configuration from an area 2162 can be used for generating a first data set which provides information relating to the object surface. The solid angle over which the scanning device in the first configuration is capable to receive electromagnetic signals is illustrated by the line 2161. The first configuration collects electromagnetic signals at the position marked with the dot 216.

The area 2162 covers both the first structure 211 and the second structure 212 such that the acquired first data set comprises data relating to both structures. Thereby the relative position of these structures can be determined with a precision limited by the spatial resolution of the first configuration instead of being limited by accumulated offset errors occurring in the combination of second data sets over the surface between the structures.

When the integrated 3D scanner is moved to a position where the second configuration can collect electromagnetic signals (marked with the dot 230), the second data sets can be acquired from the area 2302. The solid angle over which the scanning device in the second configuration is capable to receive electromagnetic signals is illustrated by the line 2301.

When the scanning of the first structure 211 is completed, the integrated scanner is moved to the second structure 212 which then is scanned using the second configuration. During the movement, the first configuration may continuously acquire first data sets but this may not be required if the first data set acquired at the position 216 comprises sufficient data relating to both structures.

The second data sets relating to the first and second structures 211, 212 can then be combined with the acquired first data set to provide a virtual 3D representation of the surface wherein the first and second structures are in a relatively higher resolution and their relative position is determined with an improved accuracy compared to what can be obtained using only the second configuration.

In some cases there is a desire to reduce the amount of data acquired from the surface 210 of the object or to reduce the scan time. This may e.g. be so when there is no need for acquiring data in the relatively higher resolution from the area between the structures 211, 212. When it is sufficient to scan the part of the surface between the structures 211, 212 using the first configuration the amount of data acquired by the integrated 3D scanner may be reduced and along with it the scan time, since a high-resolution scanning often is more time consuming that a low-resolution scanning.

In such cases, the option of acquiring data in a two resolutions with the integrated 3D scanner also provides an advantage over prior art scanners.

Figure 2B:
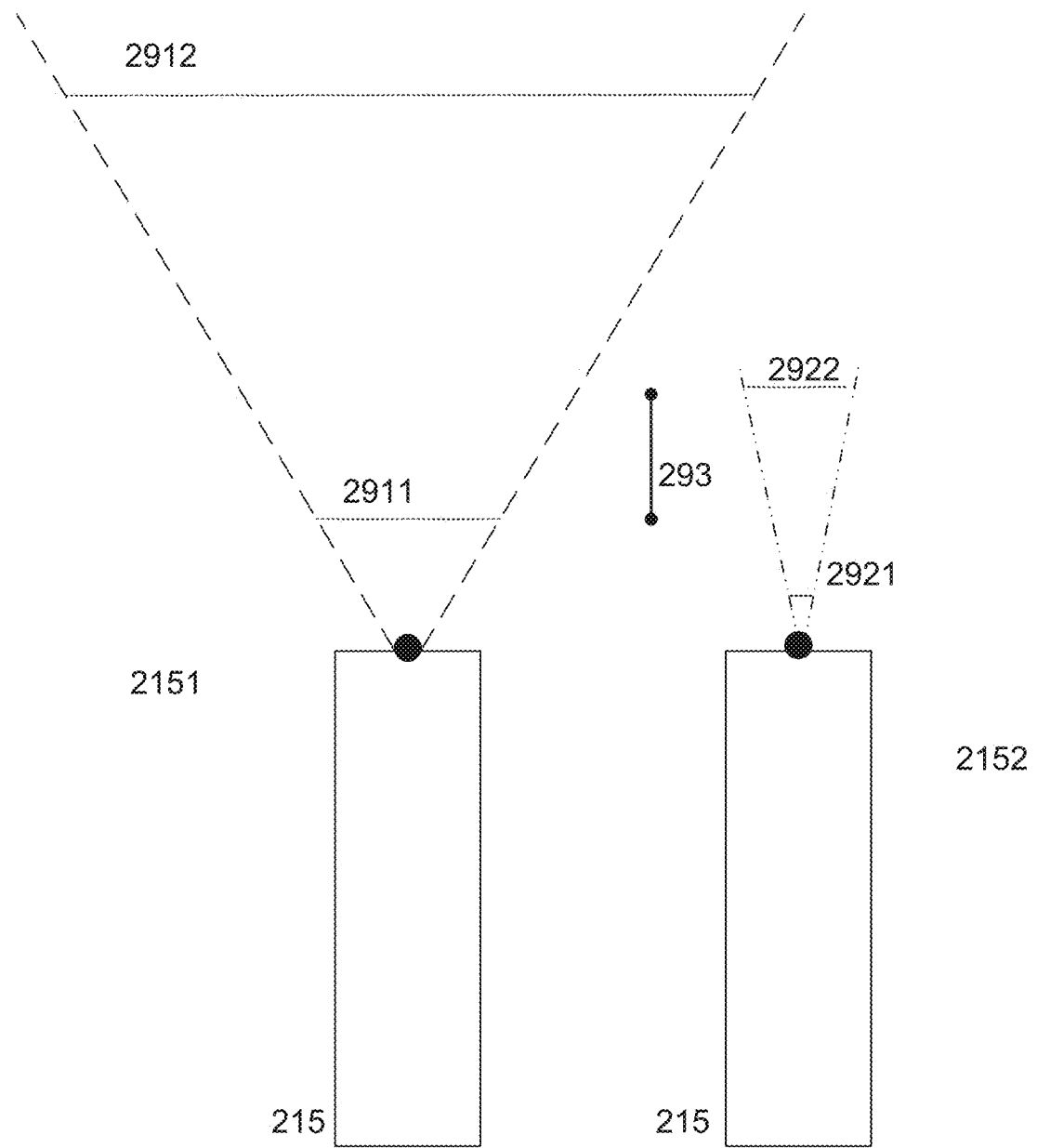

FIG. 2b illustrates the ranges of distances in which a surface may have to be arranged for the configurations of the scanning device to acquire data relating to the surface.

When the scanning device is the first configuration 2151, first data sets may be acquired at distances in the first range of distances extending from a minimum distance 2911 to a maximum distance 2912 from the integrated 3D scanner 215.

When the scanning device is the second configuration 2152, second data sets may be acquired at distances in the second range of distances extending from a minimum distance 2921 to a maximum distance 2922 from the integrated 3D scanner 215.

The overlapping range of distances is from the integrated 3D scanner is indicated with the line 293 extending from the minimum distance 2911 of the first configuration to the maximum distance 2922 if the second configuration.

Figure 3:
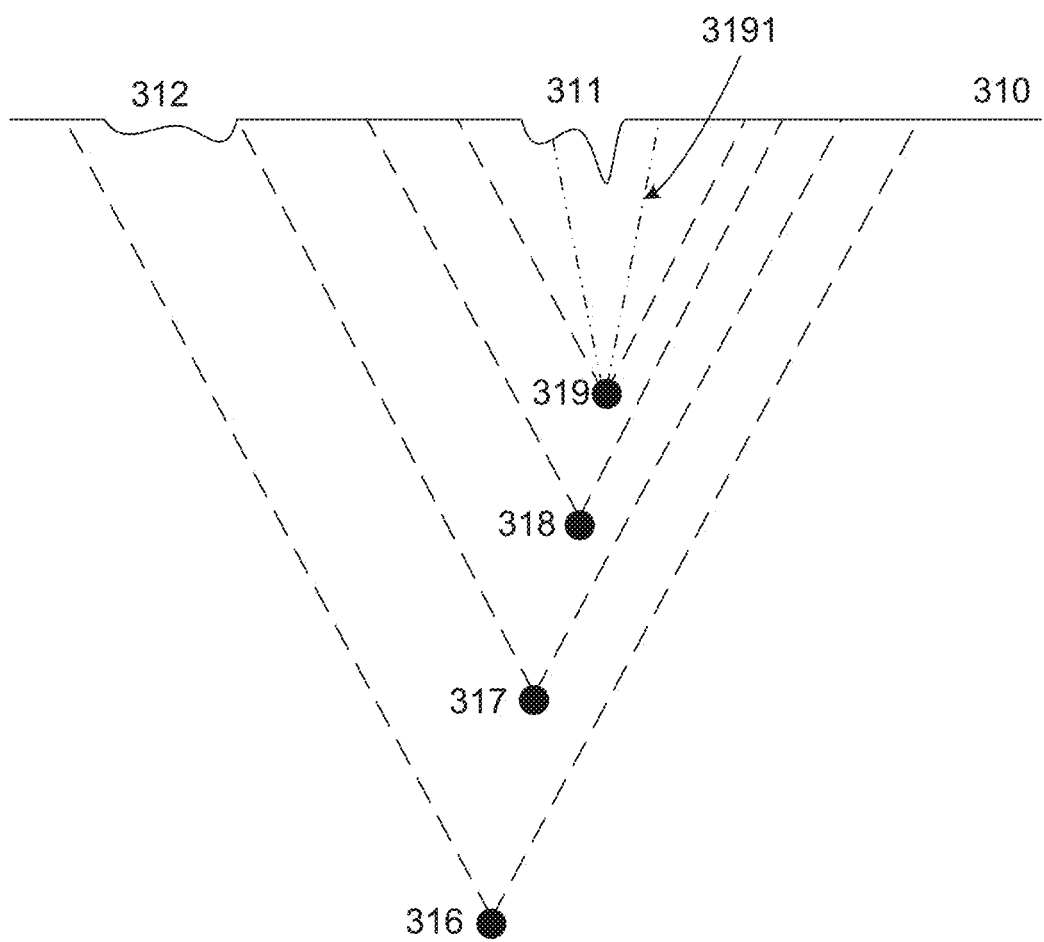
FIG. 3 shows a schematic of the movement of the integrated 3D scanner towards the surface of an object.

FIG. 3 shows a schematic of the movement of the integrated 3D scanner towards the surface of an object.

When the scanning device is capable of operating continuously in the first configuration, the first configuration can monitor the approach of the integrated 3D scanner towards the surface of an object. This can be realized by e.g. monitoring the first parameter such that information is provided to or provided by the control unit, which then determines when the integrated 3D scanner is at a distance where the second configuration of the scanning device is capable of acquiring the second data set relating to the object surface.

In the figure, the position of the integrated 3D scanner is illustrated by the dots marking the positions at which the scanning device collects electromagnetic signals.

At the initial position 316 the first configuration acquires first data sets relating to a part of the surface including both a first structure 311 and a second structure 312.

The integrated scanner can then be moved towards the surface. In the figure, this is indicated by a discrete number of positions 317, 318 and 319 but in principle, the movement may be smooth with first data sets being acquired continuously by the first configuration.

When the integrated 3D scanner has reached the position marked with dot 319, the value of the first parameter indicates that the distance between the surface and the integrated 3D scanner is within the second range of distances and the scanning device automatically starts operating in the second configuration as illustrated with the lines 3191. The scanning device may continue to operate in the first configuration during the scanning of the structure 311 using the second configuration, or it may operate only in the second configuration.

Alternatively or in addition to the use of the first parameter, the distance to the object surface may be determined using a distance measurement unit acting as an additional measurement unit. The distance measurement unit may be configured for a time of flight measurement.

Figure 4:
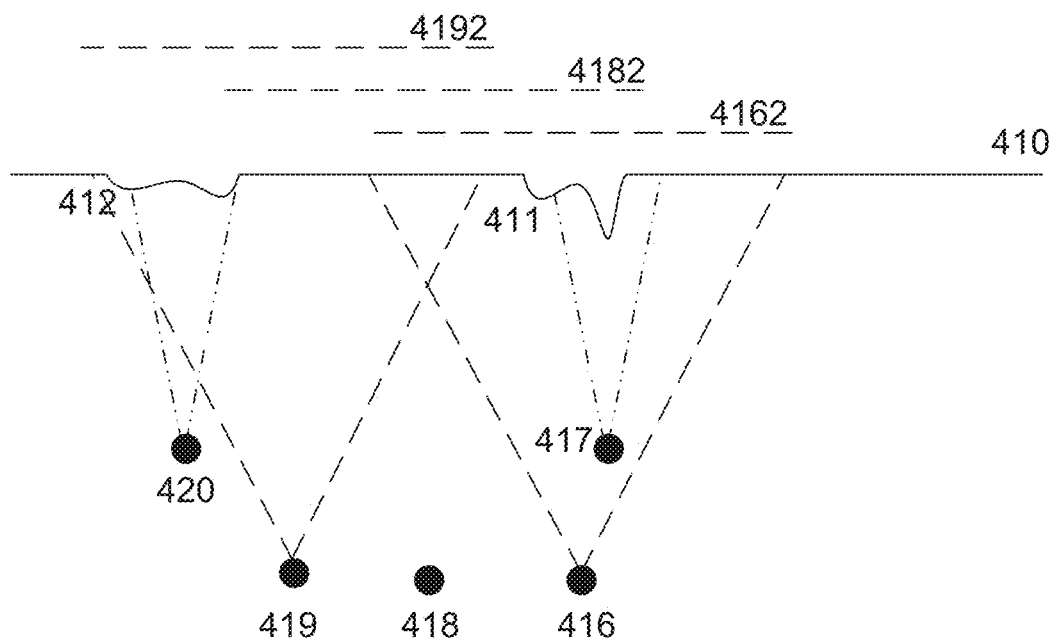
FIG. 4 shows a schematic of the movement of the integrated 3D scanner relative to the surface of an object when the surface is scanned.

FIG. 4 shows a schematic of the movement of the integrated 3D scanner relative to the surface of an object when the surface is scanned.

The scanning device of the present disclosure can operate in a first configuration adequate for scanning relatively larger areas of the surface compared to the relatively smaller area which can be viewed by the scanning device in the second configuration.

That is, the integrated 3D scanner of the present disclosure can be used for scanning surfaces of objects where interesting structures are separated by distances that are relatively large compared to the surface area which can be viewed by the scanning device in the second configuration.

Some objects have surfaces with a number of structures that are located with a structure-to-structure distance which is larger than area from which the scanning device can detect electromagnetic signals when operating in the second configuration In FIG. 4 is illustrated how the integrated 3D scanner can be moved from a position (here marked with the dot 417) where the second configuration can acquire second data sets relating to a first structure 411 on the object surface 410, to another position 420 where second data sets relating to a second structure 412 can be acquired. After a number second data sets relating to the first structure 411 has been acquired, the integrated 3D scanner is moved slightly away from the surface to a position 416 where the field of view of the first configuration covers a larger portion of the object surface. The integrated 3D scanner is then moved further to a position 418 at which the first configuration is capable of viewing an area 4182 which is sufficiently large to provide that the first data set acquired at position 418 relates to both the first structure 411 and the second structure 412. While scanning the surface in the first configuration, the integrated 3D scanner is moved to position 419 where the viewed area 4192 covers the second structure. From this position 419 the integrated 3D scanner is moved towards the surface 410 until e.g. the value of the first parameter or a distance measurement reading from a distance measurement unit indicates that the scanning device is at a position 420 where it is capable of acquiring second data sets using the second configuration. The second structure 412 can then be scanned from this position 420 such that a number of second data sets are acquired.

The first data sets acquired at the areas 4162, 4182 and 4192 of the surface can then be combined by the data processing unit to provide a first virtual 3D representation of the surface in a relatively lower resolution. Since the areas 4162, 4182 and 4192 are overlapping and each area comprises at least one structure, the relative positions of the first structure 411 and the second structure 412 is determined with an accuracy determined by the spatial resolution of the first configuration.

The second data sets acquired at the first structure 411 and the second structure 412 can then be combined with the first virtual 3D representation of the surface to provide a virtual 3D representation of the surface, where the relative position of the first and second structures is provided by the spatial resolution of the first configuration and where the resolution of the portion of the virtual 3D representation corresponding to the second structures is high.

Figure 5:
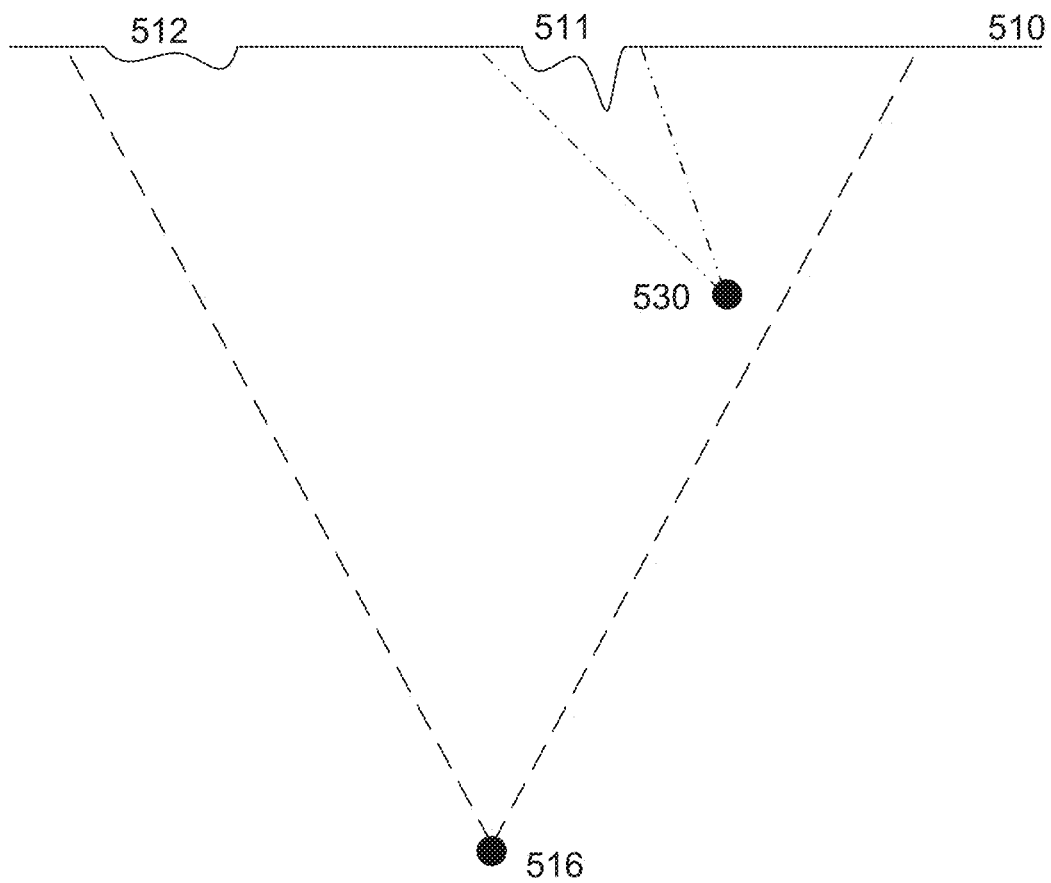
FIG. 5 shows an example of how the integrated 3D scanner can be used for scanning the surface of an object.

FIG. 5 shows an example of how the integrated 3D scanner can be used for scanning the surface of an object.

The scanning of the structures on a surface may require that second data sets relating to the structure are acquired from a number of angles relative to the surface. This is illustrated in this figure where the integrated scanner is arranged at an angle relative to the surface which differs from the angle at which the first data sets area acquired.

The integrated 3D scanner has been moved from a first position 516 relative to the surface 510, to a second position 530 within the second range of distances, at which the second configuration can acquire second data sets of the structure 511. The integrated 3D scanner can then acquire second data sets from a number of orientations relative to the surface.

Figure 6:
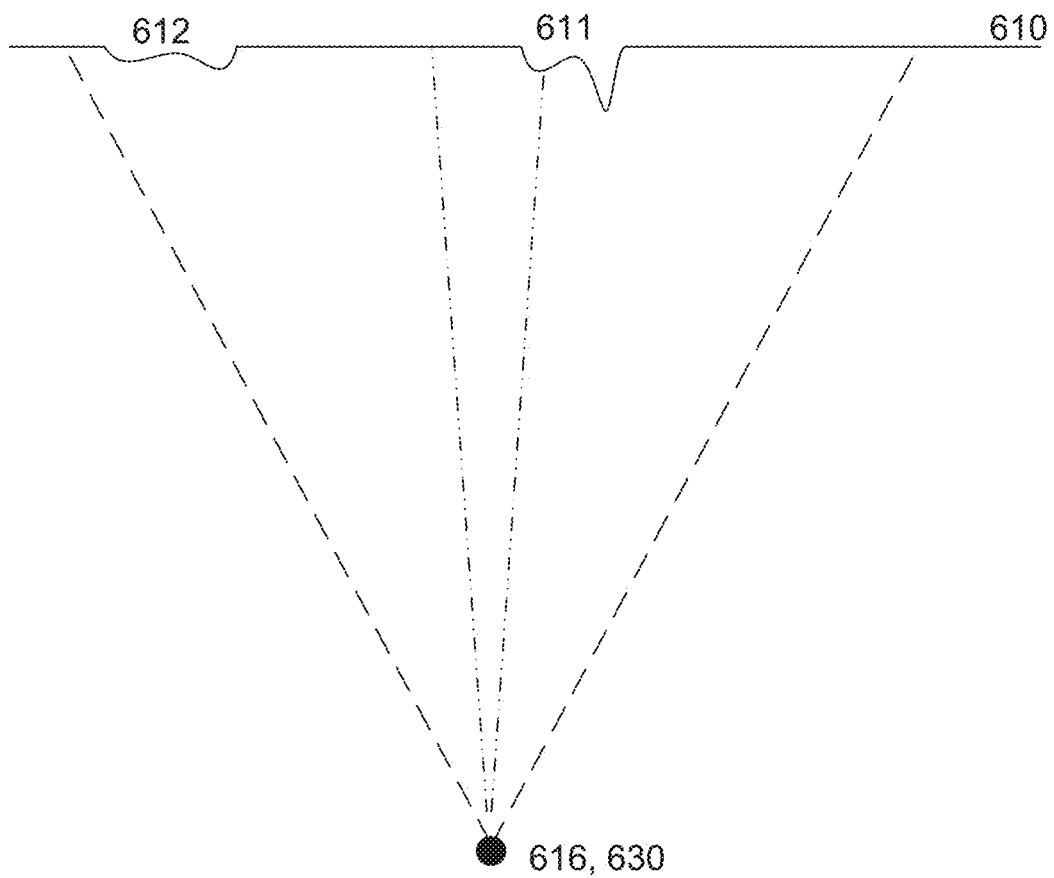
FIG. 6 show an example of the integrated 3D scanner wherein the second configuration may provide a zooming into the surface while the integrated 3D scanner is held at a fixed position relative to the surface.

FIG. 6 show an example of the integrated 3D scanner, wherein the second configuration may provide a zooming into the surface while the integrated 3D scanner is held at a fixed position relative to the surface.

In the first configuration the integrated 3D scanner is at one position 616 and views a relatively larger portion of the surface 610. In second configuration the integrated 3D scanner is at a position 630 and views a relatively smaller portion of the surface 610. At illustrated in this figure the two positions may coincide. The two positions may also be offset, e.g. such that the position 630 of the integrated 3D scanner in the second configuration is close to the surface.

Second data sets acquired when zooming in on the structure 611 may subsequently be combined with first data sets acquired by the first configuration.

The zooming may be provided by a zoom lens system known to the skilled person, and the first and second configurations of the scanning device may utilize the same array of sensor elements for detecting electromagnetic signals from the object surface that have passed through said zoom lens system.

Figure 7:
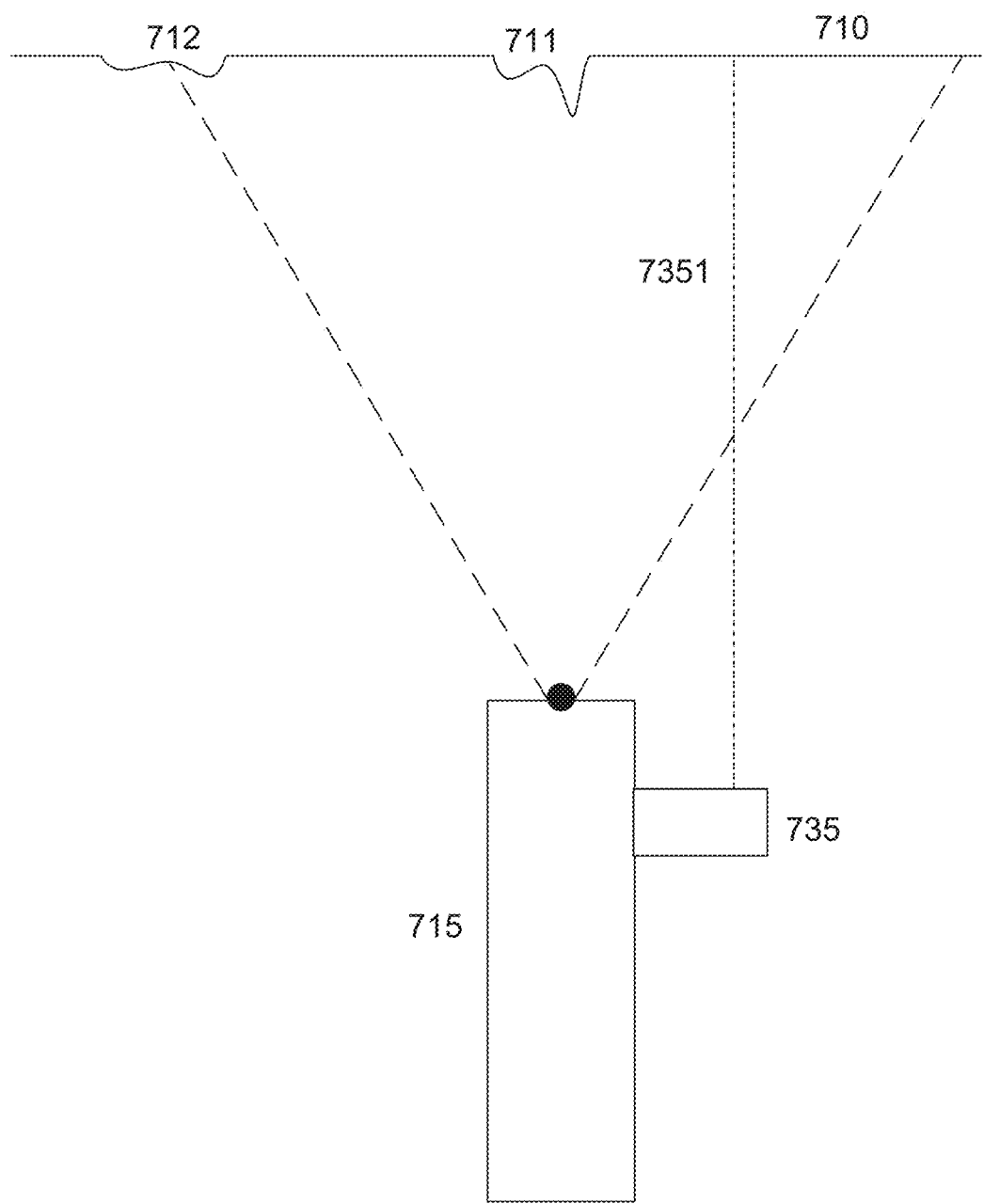
FIG. 7 shows an example where a distance measurement unit is used to determine the distance between the integrated 3D scanner and the surface.

FIG. 7 shows an example where a distance measurement unit is used to determine the distance between the integrated 3D scanner and the surface.

The acquired first data sets can be used to monitor the relative position of the integrated 3D scanner and the surface. Other methods can also be applied in order to monitor the relative position, such as a distance measurement.

In FIG. 7, the integrated 3D scanner 715 comprises a distance measurement unit 735 which is capable of determining the distance to the surface 710 along a path 7351.

The control unit can then be adapted to monitor the distance such that the second configuration starts to acquire second data set when the distance within the second range of distances. The control unit can control the acquiring of data sets based on the distance measured by the distance measurement unit 735.

When the distance as measured with the distance measurement unit 735 is within the second range of distances, the control unit automatically initiates the acquiring of second data sets with the second configuration of the scanner device. Second data sets relating to one or more structures 711, 712 on the surface 710 can be acquired by scanning the structures 711, 712 one at a time, where the second data sets are acquired in a relatively higher resolution.

In addition to the acquiring of second data sets, the scanner device is capable of acquiring first data sets using the first configuration of the scanner device, where the first data sets are acquired in a relatively lower resolution.

The acquired first and second data sets can be combined by the data processing unit to provide a virtual 3D representation of the surface, in which virtual 3D representation the structures 711, 712 are provided in a relatively higher resolution while the area between these structures is provided in a relatively lower resolution.

The distance measurement unit may apply a time of flight based technique for determining the distance to the surface.

Figure 8:
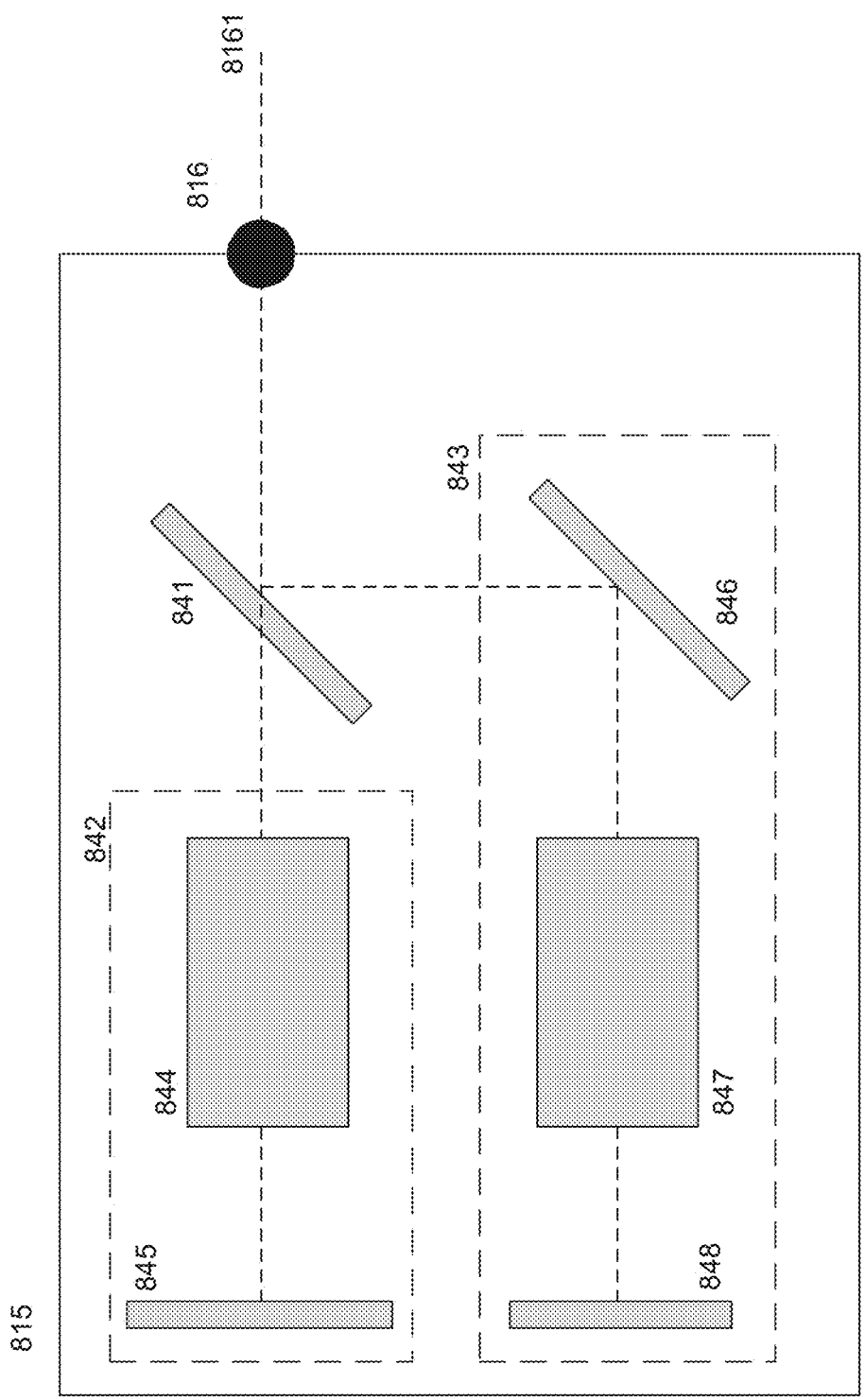
FIG. 8 shows a schematic presentation of the optical system in an embodiment of the integrated 3D scanner.

FIG. 8 shows a schematic presentation of the optical system in an embodiment of the integrated 3D scanner.

In this Figure is illustrated an embodiment where electromagnetic signals 8161 are received at the same location 816 by the first and the second configurations of the scanning device. When entering the scanning device 815 the electromagnetic signals 8161 are divided by an optical component 841 which guides one part of the electromagnetic signals into the first configuration 842 and one part into the second configuration 843. The optical component may be a polarization beam splitter or a dichroic mirror separating electromagnetic signals depending on polarization or wavelength of the light, respectively. In some embodiments, the optical component 841 is a mirror arranged to be moved into and out of the beam path, such that the electromagnetic signals are guided into the first configuration 842 or the second configuration 843 depending on the optical component 841 being out of or in the path of the electromagnetic signals, respectively.

In the first configuration 842, the electromagnetic signals may be guided into a first signal manipulating arrangement 844 before being received and detected by a first signal detecting unit 845. The signal manipulating arrangement 844 may comprise optical components such as lenses, apertures or mirrors.

In the second configuration 843, the electromagnetic signals may be guided by a mirror 846 into a second signal manipulating arrangement 847 before being received and detected by a second signal detecting unit 848. The signal manipulating component 847 may comprise optical components such as lenses, apertures or mirrors.

One advantage of such a design of the scanning device may be that it can provide an integrated 3D scanner where there is no offset between the locations where the first and second configurations receives electromagnetic signals from e.g. the surface of an object.

Figure 9:
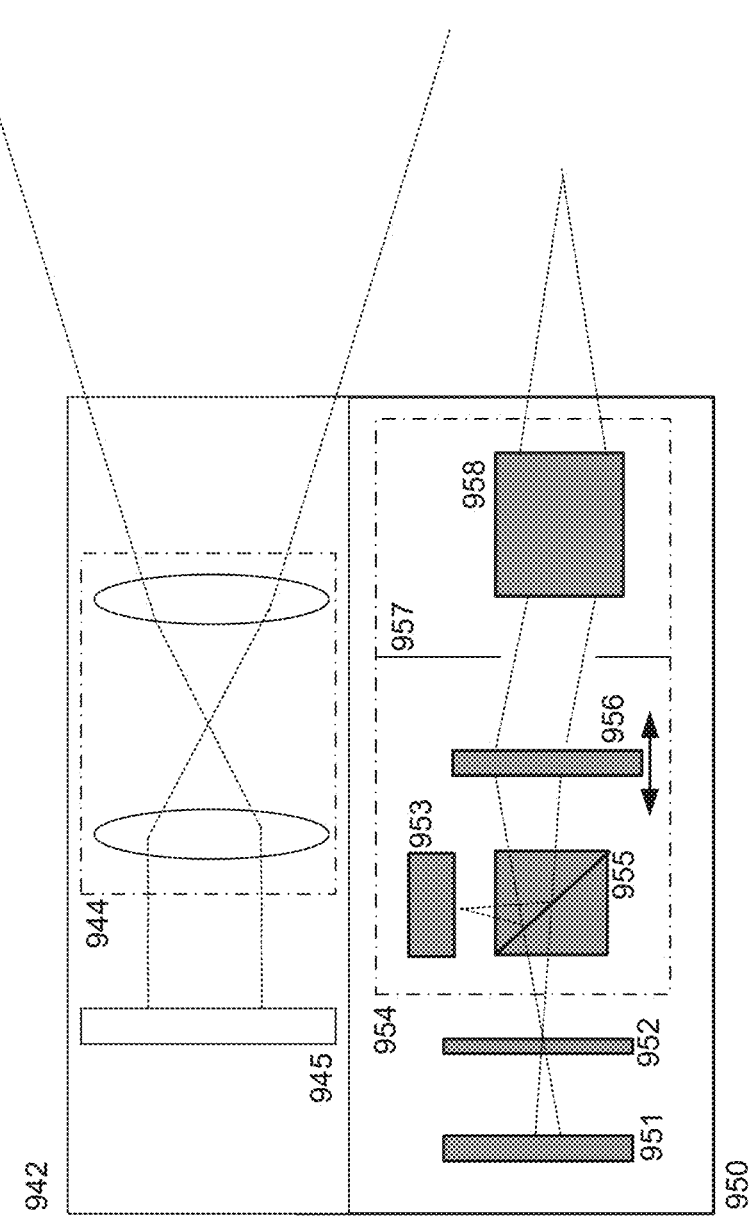
FIG. 9 shows a schematic presentation of the optical system in an embodiment of the integrated 3D scanner.

FIG. 9 shows a schematic presentation of the optical system in an embodiment of the integrated 3D scanner.

The scanning device illustrated here comprises a first configuration 942 where electromagnetic signals are guided through a first signal manipulating arrangement 944 before being received and detected by a first signal detecting unit 945. Here the signal manipulating arrangement 944 is illustrated as having two lenses but the skilled person will acknowledge several designs that may be applied for different purposes.

The second configuration 950 comprises a focus scanning unit. The focus scanning unit comprises a light source 951 that may comprise collimation optics, a pattern 952, a first camera 953, an optical system 954 comprising a beam splitter 955 that may be polarizing, focusing optics 956, an aperture 957, and other optical elements 958. Some light rays emitted from the light source 951 and imaged through the optical system onto the surface of an object, returned through the optical system, and imaged onto the camera 953 are illustrated as dotted lines. During the acquisition of a data set, the focusing optics 956 is moved relative to the other optical components such that the focal plane of the second configuration is moved along the optical axis of the second configuration. In some embodiments the focus scanning unit is designed according to the focus scanning apparatus of WO 2010/145669.

Focus scanning units may be used for both the first and the second configuration of the scanner device, such that a first focus scanning unit acquires one or more first data sets and a second focus scanning unit acquires one or more second data sets.

A claim may refer to any of the preceding claims, and "any" is understood to mean "any one or more" of the preceding claims.

It should be emphasized that the term "comprises/comprising" when used in this specification is taken to specify the presence of stated features, integers, steps or components but does not preclude the presence or addition of one or more other features, integers, steps, components or groups thereof.

The use of the integrated 3D scanner above and in the following may be supported by software which is carried out on a data handling system by the execution of computer-executable instructions. The instructions may be program code means loaded in a memory, such as a RAM, from a storage medium or from another computer via a computer network. Alternatively, the integrated 3D scanner may be implemented by hardwired circuitry instead of software or in combination with software.

The invention claimed is:

1. A scanner system for scanning an object, comprising:
an integrated 3D scanner comprising a scanning device configured for operating in a first configuration with optical components and an imaging sensor element, and for operating in a second configuration, wherein when the integrated 3D scanner operates in the second configuration, electromagnetic radiation from the object travels through the same optical components and uses the same imaging sensor element as when operating in the first configuration,
where:
in said first configuration the scanning device is adapted for acquiring a first data set relating to a first region of the object with electromagnetic signals in the infrared range at a first spatial resolution; and
in said second configuration the scanning device is adapted for acquiring a second data set relating to a second region of the object at a second spatial resolution and with electromagnetic signals in a range different from the infrared range used in the first configuration, wherein the second spatial resolution is higher than the first spatial resolution,
where the scanner system further comprises:
means for converting the second data set to a 3D model, wherein the 3D model is created solely from the second data set;
a data processing unit configured for associating pixels in the first data set with the 3D model that is created solely from the second data set; and
means for converting the first data set to a 2D image.

2. The 3D scanner system according to claim 1, wherein the scanning device in one of the configurations records geometrical information for a larger area of the object than in another of the configurations.

3. The 3D scanner system according to claim 1, wherein the scanning device is operated in one of the configurations when a distance from the scanning device to the object is within a first range of distances from the object and the scanning device is operated in another of the configurations when the distance from the scanning device to the object is within a second range of distances from the object.

4. The scanner system according to claim 1, wherein the integrated 3D scanner comprises a control unit configured for controlling an operation of the scanning device.

5. The scanner system according to claim 4, wherein the control unit is configured to automatically change the operation of the scanning device between the first configuration and the second configuration.

6. The scanner system according to claim 4, where the control unit is configured to control the operation of the scanner device based on a value of a first parameter derived from one of the data sets.

7. The scanner system according to claim 4, where the control unit is configured to control the operation of the integrated 3D scanner based on a value of a parameter derived from one of the data sets.

8. The scanner system according to claim 1, wherein a ratio between spatial resolutions provided by one of the configurations and another of the configurations of the scanning device is below 0.6.

9. The scanner system according to claim 1, wherein a ratio between spatial resolutions provided by one of the configurations and another of the configurations of the scanning device is below 0.3.

10. The scanner system according to claim 1, wherein the integrated 3D scanner comprises a first scanning unit which at least in part realizes the first configuration of the scanning device, and wherein the integrated 3D scanner comprises a second scanning unit which at least in part realizes the second configuration of the integrated 3D scanner.

11. The scanner system according to claim 1, where the integrated 3D scanner comprises a measuring device configured for performing at least one measurement.

12. The scanner system according to claim 11, wherein acquiring the first or the second data sets is controlled based on a value of a parameter derived from the at least one measurement.

13. The scanner system according to claim 11, where the measuring device comprises a distance measurement unit for time of flight measurement configured for measuring a distance from the integrated 3D scanner to the object.

14. The scanner system according to claim 1, wherein the integrated 3D scanner is configured to acquire a number of data sets when operated in one of the configurations and wherein the integrated 3D scanner is capable of acquiring a number of data sets when operated in another one of the configurations.

15. The scanner system according to claim 1, wherein the integrated 3D scanner comprises a single sensor element configured for acquiring both the first data set and the second data set.

16. The scanner system according to claim 1, wherein the integrated 3D scanner is configured to change the spatial resolution at which the first data set and the second data set is acquired.

17. The 3D scanner system according to claim 1, wherein associating the first data set with the second data set includes combining the first data set with the second data set.

18. The 3D scanner system according to claim 1, wherein associating the first data set with the second data set includes combines the first data set with the second data set into a common reference system.

19. The 3D scanner system according to claim 1, wherein associating the first data set with the second data set includes aligning the first data set and the second data set into a common reference system and then merging the first data set with the second data set to create a 3D model of the object.

20. The scanner system according to claim 1, wherein a position of a lens of the optical components in the first configuration is different than the position of the lens in the second configuration.

21. The scanner system according to claim 1, wherein, when operating in the first and second configurations, the integrated 3D scanner shares a number of optical components.

22. A scanner system for scanning an object, comprising:
an integrated 3D scanner comprising a scanning device configured for operating in a first configuration with optical components and an imaging sensor element, and for operating in a second configuration, wherein when the integrated 3D scanner operates in the second configuration, electromagnetic radiation from the object travels through the same optical components and uses the same imaging sensor element as when operating in the first configuration,
where:
in said first configuration the scanning device is adapted for acquiring a first data set relating to a first region of the object with electromagnetic signals in the infrared range at a first spatial resolution; and
in said second configuration the scanning device is adapted for acquiring a second data set relating to a second region of the object at a second spatial resolution, wherein the second spatial resolution is different from the first spatial resolution,
where the scanner system further comprises means for converting the second data set to a 3D model; and
a data processing unit configured for associating pixels in the first data set with the 3D model;
wherein the integrated 3D scanner comprises:
a control unit configured for controlling an operation of the scanning device, and
means for converting the first data set to a 2D image; and
wherein the control unit is configured to automatically change between operating the scanning device in the first and second configurations simultaneously and operating the scanning device in only one of the first and second configurations.

23. The scanner system according to claim 22, wherein the second spatial resolution is higher than the first spatial resolution.

24. The scanner system according to claim 22, wherein the second spatial resolution is lower than the first spatial resolution.

* * * * *